United States Patent
Jain et al.

(10) Patent No.: US 11,461,795 B2
(45) Date of Patent: Oct. 4, 2022

(54) METHOD AND SYSTEM FOR AUTOMATED DETECTION, CLASSIFICATION AND PREDICTION OF MULTI-SCALE, MULTIDIMENSIONAL TRENDS

(71) Applicant: FLYTXT B.V., Amsterdam (NL)

(72) Inventors: Noopur Jain, Bahraich (IN); Santanu Chaudhury, New Delhi (IN); Jobin Wilson, Kerala (IN); Prateek Kapadia, Mumbai (IN)

(73) Assignee: FLYTXT B.V., Amsterdam (NL)

( * ) Notice: Subject to any disclaimer, the term of this patent is extended or adjusted under 35 U.S.C. 154(b) by 231 days.

(21) Appl. No.: 16/137,328

(22) Filed: Sep. 20, 2018

(65) Prior Publication Data

US 2019/0026761 A1 Jan. 24, 2019

Related U.S. Application Data

(63) Continuation-in-part of application No. 14/303,621, filed on Jun. 13, 2014, now abandoned.

(30) Foreign Application Priority Data

Jun. 13, 2013 (IN) ............................ 2581/CHE/2013

(51) Int. Cl.
  *G06Q 30/02* (2012.01)
  *G06N 7/00* (2006.01)
  *G06F 16/2458* (2019.01)

(52) U.S. Cl.
  CPC ..... *G06Q 30/0202* (2013.01); *G06F 16/2465* (2019.01); *G06N 7/005* (2013.01)

(58) Field of Classification Search
  None
  See application file for complete search history.

(56) References Cited

U.S. PATENT DOCUMENTS 5,758,147 A * 5/1998 Chen ................... G06F 16/2465
                                                        711/2
8,818,932 B2 * 8/2014 Nolan .................... G06N 7/005
                                                        706/55

(Continued)

FOREIGN PATENT DOCUMENTS

WO    WO-03094051 A1 * 11/2003 ........... G06K 9/6282

OTHER PUBLICATIONS

John F. Roddick et al. A Survey of Temporal Knowledge Discovery Paradigms and Methods, IEEE Transactions on Knowledge and Data Engineering, vol. 14, No. 4, Jul./Aug. 2002 (Year: 2002).*

*Primary Examiner* — Jerry O'Connor
*Assistant Examiner* — Matthew H Divelbiss
(74) *Attorney, Agent, or Firm* — Mannava & Kang, P.C.; Vinay Malik

(57) ABSTRACT

A method and system for detection, classification and prediction of user behavior trends using correspondence analysis is disclosed. The methods and systems reduce the n-dimensional feature space to a lower dimensional space for easy processing, improved quality of emerging clusters and superior prediction accuracies. Further, the method applies the correspondence analysis so that each user is assigned with a new coordinate in the lower dimension, which maintains a similarity, difference and the relationship between the variables. Once the correspondence analysis is completed, clustering or grouping of the coordinates based on the similar trends of the users is performed. Further, unlabeled cluster members are assigned class membership proportional to the labeled samples in the cluster. Finally, the method predicts the future actions of the users based on the past trends that are observed from the labeled clusters.

6 Claims, 16 Drawing Sheets

(56) References Cited

U.S. PATENT DOCUMENTS

| | | | |
|---|---|---|---|
| 2002/0194159 A1* | 12/2002 | Kamath | G06K 9/6282 |
| 2006/0291558 A1* | 12/2006 | Schreier | H04N 19/89 |
| | | | 375/E7.182 |
| 2007/0156673 A1* | 7/2007 | Maga | G06Q 30/02 |
| | | | 707/999.005 |
| 2007/0185867 A1* | 8/2007 | Maga | G06Q 30/02 |
| 2008/0162268 A1* | 7/2008 | Gilbert | G06Q 10/06375 |
| | | | 705/7.29 |
| 2012/0330779 A1* | 12/2012 | Tuzhilin | G06Q 30/0224 |
| | | | 705/26.7 |
| 2013/0273968 A1* | 10/2013 | Rhoads | H04N 5/23219 |
| | | | 455/566 |
| 2014/0176802 A1* | 6/2014 | Yu | H04N 5/147 |
| | | | 348/700 |

\* cited by examiner

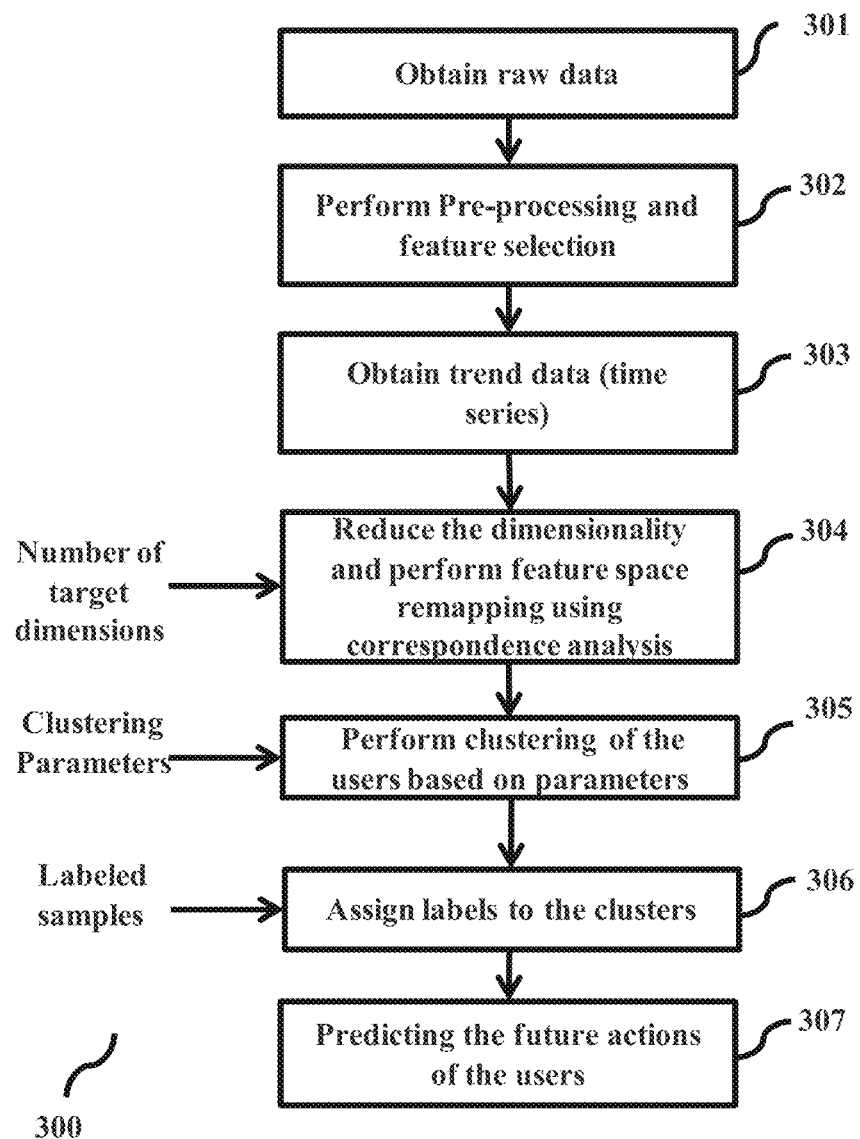

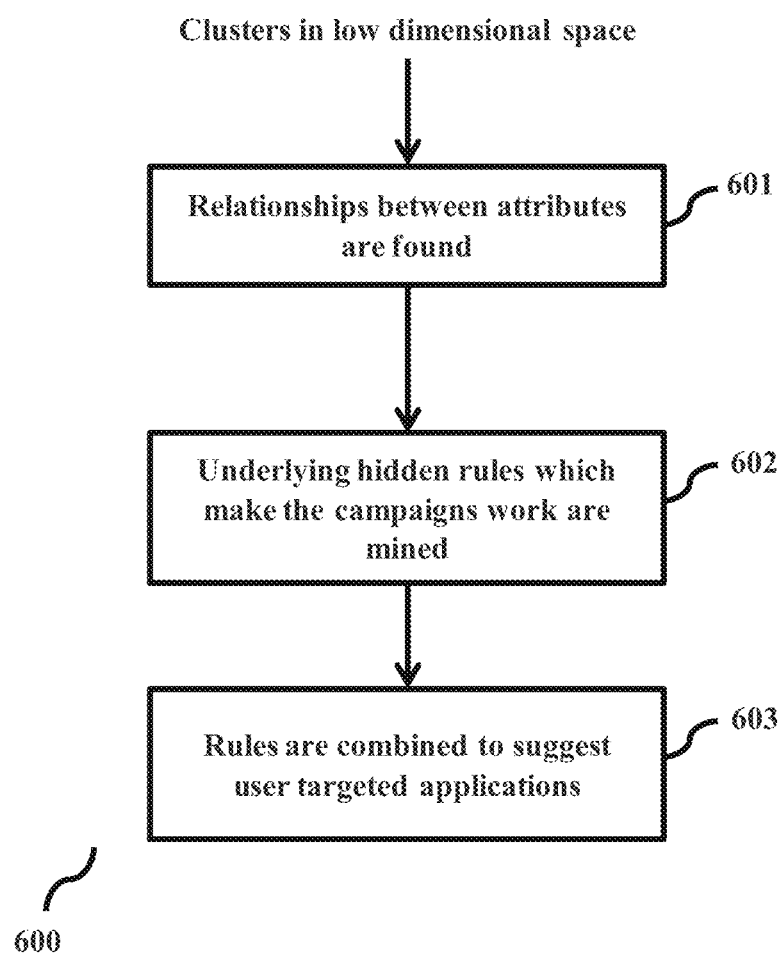

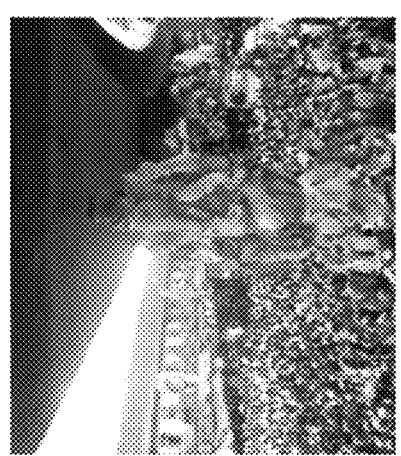
FIG. 11a

METHOD AND SYSTEM FOR AUTOMATED DETECTION, CLASSIFICATION AND PREDICTION OF MULTI-SCALE, MULTIDIMENSIONAL TRENDS

CROSS REFERENCE TO RELATED APPLICATION

This application is a continuation-in-part of U.S. Non-provisional application Ser. No. 14/303,621 filed on Jun. 13, 2014, which in turn claims foreign priority to Indian Application Serial Number 2581/CHE/2013, filed on Jun. 13, 2013, entitled A Method and System for Detection, Classification and Prediction of User Behavior Trend, the disclosures of these applications are expressly incorporated herein by reference in their entireties.

TECHNICAL FIELD

Embodiments herein relate to the field of predictive analytics and more particularly relates to a method and system for detection, classification and prediction of trends in data using correspondence analysis.

BACKGROUND

In competitive business environments, companies frequently desire to forecast events that influence business metrics and performance indicators. Indeed, such ability is often important for effective decision making. Information obtained from accurate event forecast, results in more efficient operations and cost savings for the business. For example, the business that forecasts particular requirements in the near future can make profitable adjustments to its business practices based on this information. As another example, if the business can accurately predict potential failures or inefficiencies in the business process, then requirements can be analyzed to mitigate such failures.

By recognizing future trends, companies can potentially increase efficiency and gain competitive advantage. Accurate recognition of such trends also results in significant cost savings and improved business processes.

In certain business applications, there are many situations where the behavior of users should be predicted and analyzed for taking actions according to the behavioral trends. Further, the events generated by the users are sources of precious information about their behavior, interactions, preferences as well as temporal changes in their behavior and preferences. In the current scenario, the marketers are not able to take the advantage of the data related to the user that is available in large amounts. This prevents the service providers or marketers from providing accurate service personalization, customized personal offers and others based on the user behavior trends. In case of large data sets, it would be complex and expensive to predict behavior of each and every user at an individual level.

In real life applications, there are many cases when user's behavior needs to be predicted and actions for future need to be taken accordingly. But in case of a large dataset or subject, it will not be feasible to predict behavior of each and every user one at a time. This results in a need to group users representing similar trend over different time instances i.e. a large multinomial data and to analyze clusters and not the individual users.

For example, in telecommunications, churning is very big problem. Operators always want to predict users who may churn in near future so that some corrective actions can be taken. If we can find the trends of mobile usages of those users who are actually churned then we can predict the behavior of other customers i.e. those who are following the same trend as the churned customers.

The existing methods of trend recognition and predictions based on numerical time series data are based on individual users, where each user is treated as an independent entity. The representation as well as grouping of millions of users (for example users in a telecommunications network) based on such time-series data is an expensive option in terms of space and time complexity. The existing system lacks the mechanism for a low-dimension representation of the time series for global trending pattern of a data set. Discovering the trends and grouping users showing similar trend in such kind of multinomial data is difficult because of less visual interpretability of the high dimensional data.

Prediction at individual level using SVM (Support Vector Machines) gives quite good results. But it is very complex to be applied on millions of data records. Moreover, it does not find the similarity between the trends of data points.

BRIEF DESCRIPTION OF THE FIGURES

Embodiments herein are illustrated in the accompanying drawings, throughout which like reference letters indicate corresponding parts in the various figures. The embodiments herein will be better understood from the following description with reference to the drawings, in which:

FIG. 3 illustrates a flow diagram explaining the various steps involved in predicting the trends in data, according to the embodiments as disclosed herein;

FIG. 6 is a flowchart illustrating the process of optimizing campaigns and performing product bundling for a user based on clusters, according to embodiments as disclosed herein;

FIGS. 11a, 11b and 11c depict an example scenario where trends are determined in a video, according to embodiments as disclosed herein.

DETAILED DESCRIPTION OF EMBODIMENTS

Figure 1:
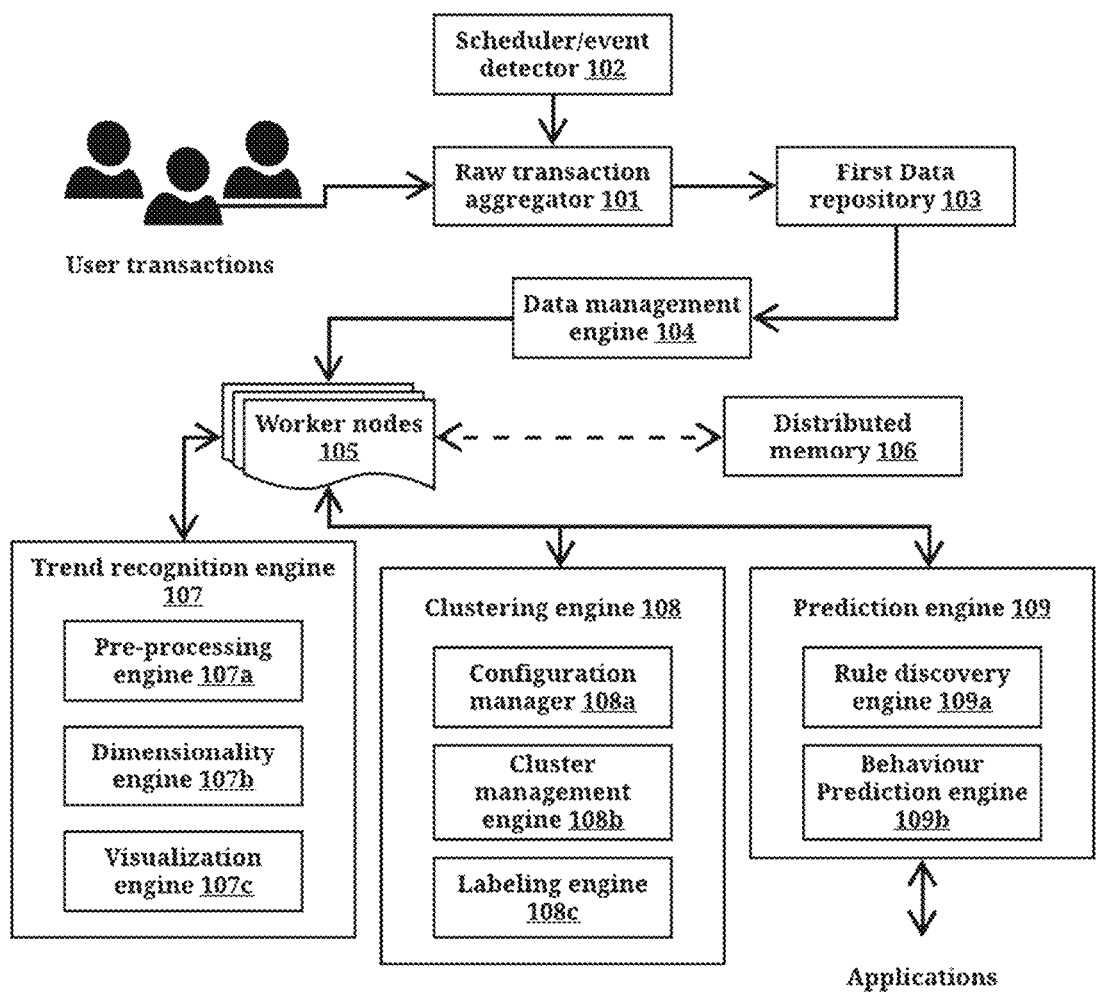
FIG. 1 illustrates a system for detection and classification of trends in data using correspondence analysis, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Embodiments herein may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Provided herein is a scalable mechanism for grouping data based on similar trends in n-dimensional space using correspondence analysis. The method provides a framework for clustering or grouping the data, representing trends in the data in an n-dimensional space, using correspondence analysis. The method reduces the n-dimensional feature space to a lower dimensional space for easy processing, better interpretation and for generating superior quality clusters, Further, the method applies correspondence analysis to the data so that each data point can be assigned with a new coordinate in the lower dimension which maintains a similarity, difference and the relationship between the variables.

Once the correspondence analysis is done, clustering or grouping of the coordinates based on the similar trends of the data is performed. Further, unlabeled cluster members are assigned class membership proportional to the labeled samples in the cluster. Embodiments herein can further resolve label conflicts among clusters by considering similarity among pairs of clusters. Embodiments herein can perform tasks in a distributed fashion, wherein a plurality of distributed nodes can perform tasks related to embodiments as disclosed herein.

As the cluster labeling, as disclosed herein, comprises data aggregation steps expressible as a set of associative and commutative steps (e.g. accumulating votes for a cluster label is only a sum operation), data management engine assigns the tasks to worker nodes for executing the task in a distributed fashion. For instance, each worker node can calculate the total votes accumulated for a label based on instances assigned to it, and the data management engine finally aggregates the total votes accumulated for the label from all the worker nodes. Finally, the method predicts the future trends in the data based on the past trends that are observed from the labeled clusters. An administrator for the purpose of manual analysis, labeling and mapping to predicted trends and actions, may inspect completely unlabeled clusters.

The embodiments herein achieve a method and system that provides a scalable mechanism for grouping data based on similar trends in n-dimensional space using correspondence analysis.

Correspondence analysis is a data analysis technique for contingency tables and multivariate or multinomial data. Correspondence analysis also allows the graphical representation of the result in lower dimension for its easy interpretation, maintaining the similarity or dissimilarity between the rows and the column of the correspondence table.

In an example herein, embodiments herein can be applicable in the context of any user transaction based system (for example in a telecom network, banking system and so on). Embodiments herein provide a framework for clustering or grouping the users representing similar trends in the n-dimensional space using correspondence analysis.

In an example herein, embodiments herein can be applicable in the context of any trends in video based application (such as safety management, crowd management, and so on). Embodiments herein provide a framework for clustering or grouping objects present in the video representing similar trends in the n-dimensional space using correspondence analysis.

The correspondence analysis is used to recognize the trends or nature of the data on the basis of their numerical attributes as well as temporal variation of such attributes.

Embodiments disclosed herein reduces the n-dimensional feature space to a lower dimensional space for easy processing and interpretation, without losing the trend information of each data point, using correspondence analysis. Further, each data point can be assigned with a new coordinate in the lower dimension, which maintains a similarity, difference and the relationship between the variables, as they existed in the higher dimensional space.

Once the correspondence analysis is done, clustering or grouping of the coordinates based on the similar trends of the data is performed.

Further, unlabeled cluster members are assigned class membership proportional to the labeled samples in the cluster. Finally, the method predicts the future actions of the data points based on the past trends that are observed from the labeled clusters.

The principal object of the embodiments herein is to provide a scalable method and system for detection, classification and prediction of trends in data using correspondence analysis.

Another object of the embodiments herein is to provide a scalable method and system for effectively reducing the dimensional space using correspondence analysis on numerical multinomial data for reduction of complexity in cluster analysis and to improve quality of emerging clusters, along with superior prediction accuracies.

Embodiments herein can group data points based on the similarity of their trend over a defined time period (time series data), and predict future actions. Embodiments herein can predict and analyze data points following similar trend(s) on a group level. This decreases processing required for each and every data point in large multinomial data record and thus increases its efficiency.

Embodiments herein disclose methods and systems for clustering subjects representing similar trend in n-dimensional space using correspondence analysis, which need not be limited to the value of n and can handle any number observations at different time instances.

In an example herein, embodiments herein can perform unsupervised segmentation of objects in a video based on their similarity of their motion may be for safety management of large gathering (big crowd) in the public area, to identify the moving areas in the scene for efficient video compression, to detect unusual events, video surveillance or to analyze it further for specific purposes. Often gatherings involve movement of crowds in confined spaces such as city streets, overhead bridges, or narrow passageways. Because of the small space and big crowd there can be many catastrophic events. If the usual motion at these places is known, areas/situations susceptible to stampedes may be predicted. Embodiments herein can assist in compressing video by identifying specific motion objects of the video that may be of interest, identifying regions with a high resolution, and so on. Embodiments herein can detect unusual events in video by finding areas where objects motion is not regular or detecting deviations from normal behavior. All these above mentioned examples involve detection of regions, with similarity in the trend of their movement. Embodiments herein can recognize trends and cluster pixels of similar motion in the video.

Referring now to the drawings and more particularly to FIGS. 1 through 11c, where similar reference characters denote corresponding features consistently throughout the figures, there are shown preferred embodiments.

FIG. 1 illustrates a system for detection and classification of data trends using correspondence analysis, according to the embodiments as disclosed herein. The system depicted in FIG. 1 comprises of a raw transaction aggregator 101, a scheduler/event detector 102, a first data repository 103, a data management engine 104, a plurality of worker nodes 105, and a distributed memory 106.

The raw transaction aggregator 101 can aggregate information received from one or more user transactions at pre-scheduled intervals, or on pre-defined event(s) occurring (such as a data size limit being reached, and so on) as configured in the scheduler/event detector 102. The raw transaction aggregator 101 can provide the raw aggregated data to the first data repository 103. In an example herein, consider a group of users performing transactions with a system (for example a telecommunications network, banking system and so on). The transactions of the users are aggregated by the raw transaction aggregator 101 and stored as raw data in the first data repository 103. In another example herein, consider that a surveillance feed is connected to the system and data from the surveillance devices (such as video) are aggregated by the raw transaction aggregator 101 and stored in the first data repository 103. Embodiments herein refer to the data present in the first data repository 103 as raw data. The raw data can be multinomial data and n-dimensional.

In an embodiment herein, the data management engine 104 can be of a distributed architecture, wherein a plurality of nodes performs clustering of the data as present in the first data repository 103. In an embodiment herein, the data management engine 104 can be a standalone device. In an embodiment herein, the data management engine 104 can be implemented on the Cloud.

In an embodiment, the data management engine 104 can maintain the uploaded files over a plurality of worker nodes 105 and/or a distributed file system (any distributed file system or memory) (which may be present in the distributed memory 106). The raw transactional data logs can be distributed across multiple machines (such as a plurality of worker nodes 105 and/or a distributed file system/memory 106 (any distributed file system or memory)) and the correspondence analysis can be applied on the data in the respective machines. In an embodiment, the data management engine 104 can perform a random shuffling process of the raw transactional data logs prior to correspondence analysis, so that each of the worker nodes can process a random split of the original file.

The data management engine 104 can use the raw data to create two-way and multi-way tables containing a measure of correspondence between rows and columns, wherein the data can be arranged in rows and columns (hereinafter referred to as a correspondence table). For example, each row of the correspondence table can represent an instance (such as a subscriber) and the columns will be the observations of a single variable over time at different time instances (such as call characteristics, usage characteristics, revenue, and so on).

In an embodiment, the data management engine 104 can reduce the raw transactional logs having the n-dimensional feature space to a lower dimensional space, without losing the trend information of each user, using the correspondence table. In an embodiment, the data management engine 104 can use correspondence analysis for trend recognition and dimensionality reduction of the data in the correspondence table. The data management engine 104 can use correspondence analysis to recognize the trend of users on the basis of temporal variations of their numerical attributes. In an embodiment, the data management engine 104 can maintain the data in a distributed manner. The data management engine 104 can distribute the raw transactional data logs across multiple machines.

Once the correspondence analysis is completed, the data management engine 104 can cluster or group the data based on the similar trends of the data. Further, the data management engine 104 can assign unlabeled cluster members a class membership proportional to the labeled samples in the cluster. The data management engine 104 can predict the future trends of the data based on the past trends that are observed from the labeled clusters. In an example, the data management engine 104 can predict the future actions of the users based on the past trends that are observed from the labeled clusters.

The data management engine 104 can further apply association rule mining on the clusters discovered in a lower dimensional space. The data management engine 104 can further use the discovered rules for user targeted applications, such as optimizing advertising campaigns, performing product bundling, pricing, churn prediction, video surveillance, and so on.

The data management engine 104 can store data such as the clustered data, the discovered rules, the raw transactional data logs, in the distributed memory 106.

Each worker node can perform correspondence analysis on the individual splits as assigned by the data management engine 104, and can record the lower dimensional representation of the respective instances into a distributed file (as maintained in the distributed memory 106). In another embodiment, a distributed implementation of correspondence analysis algorithm could directly generate the lower dimensional representation of all the instances within a distributed file.

In an embodiment herein, the worker nodes 105 can perform one or more functions as performed by the data management engine 104, as described above. The worker nodes 105 can comprise modules, such as a trend recognition engine 107, a clustering engine 108, and a prediction engine 109. The trend recognition engine 107 can comprise of a pre-processing engine 107a, a dimensionality engine

107b, and a visualization engine 107c. The clustering engine 108 can comprise of a configuration manager 108a, a cluster management engine 108b, and a labeling engine 108c. The prediction engine 109 can comprise of a rule discovery engine 109a, and a behaviour prediction engine 109b.

The pre-processing engine 107a can be assigned the raw data by the data management engine 104. For example, the domain may include, but is not limited to, a telecommunications network, a banking system, a video surveillance system, and so on. Each of the data points in the raw data can have a subject numerical value of the attribute at each time instance. The pre-processing engine 107a can perform pre-processing and feature selection on the raw data. In an embodiment, the preprocessing and feature selection on the raw data comprises determining the attributes of the users, objects, and so on, present in the data. In the example of the data being related to users in a telecommunications network, an example of the attribute of the user can be minutes of usage. Further, the pre-processing engine 107a can obtain the trending data from the raw transactional logs. The trending data can include the values that change over time.

The pre-processing engine 107a can form a correspondence table using the raw data, wherein the rows of the correspondence table represent an instance (such as a subscriber) and the columns of the correspondence table will be the observations of a single variable over time at different time instances (such as call characteristics, usage characteristics, revenue, and so on). The pre-processing engine 107a can create two-way and multi-way correspondence tables containing a measure of correspondence between rows and columns from the raw data. For example, each row of the correspondence table can represent an instance (such as a subscriber) and the columns will be the observations of a single variable over time at different time instances (such as call characteristics, usage characteristics, revenue, and so on).

The dimensionality engine 107b can reduce the dimensionality of the data format of the raw data, when the feature selection and trending data are obtained from the raw transactional logs, using the correspondence table. In an embodiment, the dimensionality engine 107b can use the correspondence table to identify the trend of data on the basis of their numerical attributes. After dimensionality reduction, the new coordinates will be such that the data with similar trends in the original high dimensional time series domain will become closer to each other than that those who are dissimilar. In an example, consider users were in t-dimensional space, if the data can be mapped from t to a pre-defined number of dimensions without losing much information about the trend of the users, then it will be easily interpretable and efficiently represented in comparison to the data in t-dimensions, wherein t is greater than the pre-defined number of dimensions.

In an embodiment, the dimensionality engine 107b can reduce the raw transactional logs having the n-dimensional feature space to a lower dimensional space, without losing the trend information of each user, using the correspondence table. In an embodiment, the dimensionality engine 107b can use correspondence analysis for trend recognition and dimensionality reduction of the data in the correspondence table. The dimensionality engine 107b can use correspondence analysis to recognize the trend of users on the basis of temporal variations of their numerical attributes.

The dimensionality engine 107b can apply correspondence analysis when the trend of high dimensional user data with numerical multidimensional attributes of time series domain is processed. The dimensionality engine 107b can use correspondence analysis to determine similarities and differences among the trends of data with respect to their behavior over time and depicting the same graphically in a low-dimensional space. The dimensionality engine 107b can use correspondence analysis to assign each data point a coordinate in the lower dimension maintaining the similarity, difference and the relationship between the variables in rows and columns of the correspondence table, which means those rows which are similar in their trend will be close to each other in the new low dimensional space and those which are dissimilar will be some far apart. The dimensionality engine 107b can perform correspondence analysis based on the Eigen value of a matrix representing the correspondence table, so it can be used for dimensionality reduction similar to principal component analysis, which enables an easier interpretation of results.

In an embodiment, the dimensionality engine 107b can obtain the number of target dimensions (for example, it can be 2-dimensional or 3-dimensional based on the requirement) as an input for reducing the dimensionality of the data.

The visualization engine 107c can enable visualization of trends identified in the dimensionally reduced data. The visualization engine 107c can also verify the dimensionally reduced data.

The configuration manager 108a can be used to manage the configuration of the data with a lower dimension, as provided by the trend recognition engine 107. The configuration manager 108a can configure the clusters, the labels, and so on.

Once the correspondence analysis is completed, the cluster management engine 108b can cluster or group the data based on the similar trends of the data. The cluster management engine 108b can update clusters based on changes in the raw data/lower dimensionality data, changes in the cluster, assigned labels, label updations, and so on. The cluster management engine 108b can also determine similarity between clusters and group/un-group clusters based on the determined similarity (hereinafter referred to as trend similarity).

Once the dimensionality of the data is reduced using correspondence analysis, the clustering engine 108b can perform the clustering of the users in the lower dimensional space based on parameters to obtain unlabeled clusters based on trend similarity. Clustering of the users is performed to group the users having similar trends. In an embodiment, the clustering engine 108b can obtain the clustering parameters for performing clustering of the users based on configuration parameters.

The clustering engine 108b can perform clustering using distance-based clustering (such as K-means) and/or density based clustering (such as DBSCAN) based on user specified hyper parameters/configuration parameters (e.g. number of expected clusters K in K-means, minimum points required to form a cluster in the case of DBSCAN, and so on). The clustering engine 108b can persist summaries corresponding to each of the discovered clusters. For instance, in the case of K-means, the mean and covariance corresponding to each cluster is maintained in a distributed file in the distributed memory 106.

Figure 5:
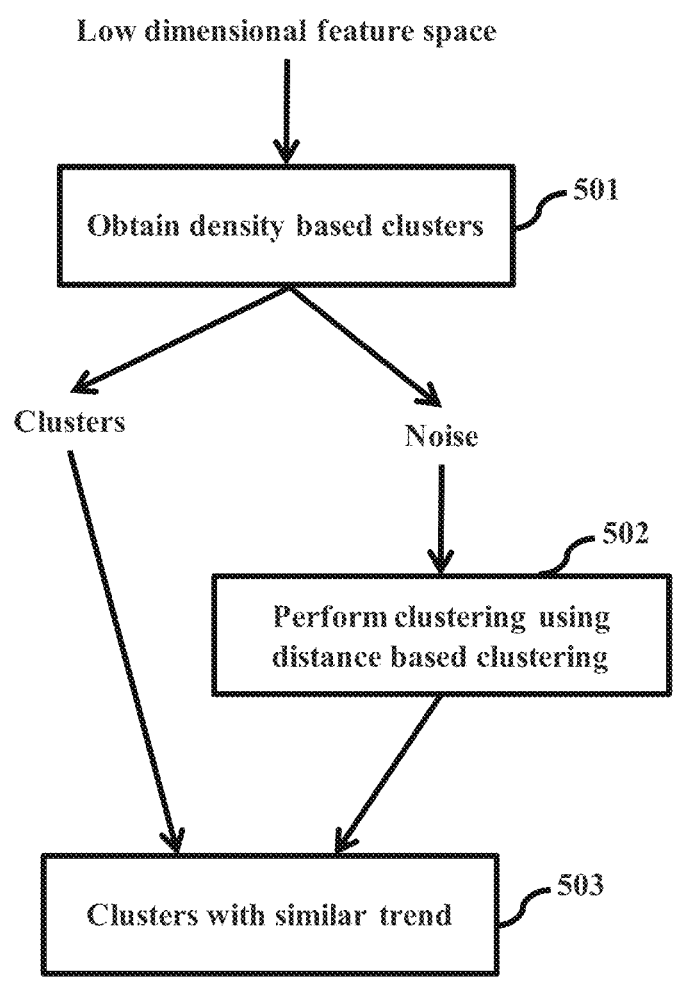
FIG. 5 depicts the process of clustering, according to embodiments as disclosed herein.

In an embodiment, the clustering engine 108b can use clustering techniques for grouping the similar trends of the users in the lower dimension such that the users with similar trends will be grouped in the same cluster. The clustering engine 108b can first apply a density based clustering to obtain (501) density based clusters, wherein users whose trend differs from the majority of the users can be considered as noise because of their lesser density. To avoid loss of this data, the clustering engine 108b can further cluster the noise using distance based clustering, before the final clusters are obtained (503) (as depicted in FIG. 5). The clusters formed in lower dimensions can retain the properties (similarities, differences and relationships), which were there in the n dimensional space.

As the lower dimensional representation of the instances capture the actual behavior trends associated with them in the original space, the discovered clusters members are likely to exhibit similar traits. Some of the newly discovered clusters may be similar to already existing clusters. Moreover, the cluster membership of existing instances might change due to the emergence of new clusters. To accommodate these aspects, the clustering engine 108b can update the clusters by initiating a cluster merging and instance reassignment process at pre-defined intervals or on pre-defined events occurring (such as data reaching a pre-defined size, and so on) or manually.

The clustering engine 108b can determine similarity among clusters using a suitable distance metric such as Euclidean distance, Cosine distance or Manhattan distance on the corresponding cluster summary representation. Lower distances among a pair of clusters indicate higher similarity. The clustering engine 108b can merge the clusters. Each worker node can calculate the similarity among all pair of clusters within its subset of clusters and record it into the distributed memory 106 if the similarity is greater than a user specified threshold (to indicate that the cluster pair is a potential candidate for merging). The clustering engine 108b can perform cluster merging process by recalculating the cluster summary representation (for example, the mean and the covariance) corresponding to each pair of merging clusters, after considering all the instances belonging to both the clusters that are being merged. After performing cluster merging, the clustering engine 108b can perform instance reassignment and cluster summary recalculation, to keep the clusters up to date.

Based on the trend similarity with the labeled samples, the labeling engine 108c can assign labels to the clusters, based on label information of the data according to historical data (which may be present in at least one of the first data repository 103 and the distributed memory 106). The clustering engine 108b can further divide the clusters into classes based on at least one other feature and the clustering engine 108b can assign each user in the cluster to be a member of at least one class. The clustering engine 108b can assign a confidence level to the data points for each predicted action, based on the class to which they belong.

Further, the labeling engine 108c can assign unlabeled cluster members/clusters, a class membership proportional to the labeled samples in the cluster. In an embodiment herein, the labeling engine 108c can perform labelling automatically. In an embodiment herein, the labeling engine 108c can enable the labelling to be done manually.

In an embodiment herein, members within a cluster can be associated with multiple labels and each of the clusters can also have multiple labels assigned. In an embodiment herein, the labeling engine 108c can use user specified thresholds for assigning labels; for example, at least 30% of samples within the cluster should have a particular label for assigning that label to the cluster.

In case of unlabeled clusters, due to lack of sufficient number of labeled samples within the unlabeled clusters, the labeling engine 108c can utilize similarity of the cluster with other clusters for labeling, using a voting scheme. The labeling engine 108c can assign a vote to each sample within a cluster for its label, which will have a unit weight. The labeling engine 108c can further assign votes to labeled samples from other clusters (having a similarity value higher than a user specified threshold) for its labels proportional to the similarity value with the current cluster. The labeling engine 108c can calculate total votes accumulated for each label after normalization. Normalization can comprise of the labeling engine 108c scaling total number of samples in the similar clusters proportional to the similarity value with the current cluster. This voting scheme is used to resolve label conflicts among clusters by considering similarity among pairs of clusters.

The labeling engine 108c can assign one or more relationship attributes to the clusters. The relationship attributes can be assigned based on the relation between the clusters, and their similarity to each other. The labeling engine 108c can determine frequency of the labels among the clusters and update the relationship attribute(s) based on the determined frequency of the labels.

The prediction engine 109 enables at least one application such as optimizing campaigns, performing product bundling, predicting churn and video surveillance using at least one rule discovered from past data by the rule discovery engine 109a.

The rule discovery engine 109a can further apply association rule mining on the samples and/or clusters with/without labels. The rule discovery engine 109a can further use the discovered rules for user targeted applications, such as optimizing advertising campaigns, performing product bundling, pricing, churn prediction, video surveillance, and so on.

The behaviour prediction engine 109b can predict the future trends of the data based on the past trends that are observed from the labeled clusters. In an example, the behaviour prediction engine 109b can predict the future actions of the users based on the past trends that are observed from the labeled clusters/data. The prediction may be in the form of rules consisting of predicates and relationships among them along with augmented statistics such as confidence measures, indicating a degree of algorithmic confidence on each rule.

For example, if there is a churn file that lists the users who are churned, the prediction engine 109 can use the trends exhibited by these users prior to churning to label other users who exhibit similar trends as potential churn candidates. Further, there can be multiple labeled lists corresponding to user actions that are observed in the past (for example churning, postpaid to prepaid switching and so on). In each of the unlabeled clusters that emerge, the prediction engine 109 can identify the number of labeled users from a particular list being present. Having more users from a labeled list (representing a class) in a cluster is a strong indication that the cluster likely represents the group of users who could potentially exhibit the same behavior.

Considering an example of processing video, it may be required to do unsupervised segmentation of objects in a video based on their similarity of their motion may be for safety management of large gathering (big crowd) in the public area, to get the moving areas in the scene for efficient video compression, to detect unusual events, video surveillance or to analyze it further for specific purposes.

For finding trend of object movement in a video, the prediction engine 109 can use the magnitude of the pixel movement over frames as an attribute of the trend recognition. The prediction engine 109 can use the optical flow to find the pattern of apparent motion of objects, surfaces, and edges in a visual scene caused by the relative motion between an observer and the scene. The prediction engine 109 can use the optical flow to get the subsequent position of the pixels from frame to frame. The prediction engine 109 can determine the optical flow as follows; if a pixel was at (u1, v1) position in one frame and the pixel moves to (u2, v2) position in the next frame then the magnitude of its movement can be calculated as $$\Delta = \sqrt{(1-2)^2 + (1-2)^2}$$

For video segmentation based on trend of object movement, embodiments herein consider that those objects that are following same trend in a video will also represent same trend in their magnitude of their displacement from frame to frame. On determining the optical flow, the prediction engine 109 can calculate the magnitude of pixels displacement consecutively over all n frames, which results the trend of pixels in time series over (n-1)-dimension(s).

The prediction engine 109 can build a two-way contingency table of multinomial numerical values using the trend recognition engine 107. The prediction engine 109 can find the similarity and the differences between the trends of motion of all pixels from frame to frame and can cluster objects having similar movement using the trend recognition engine 107. So, the prediction engine 109 can apply the trend recognition model on the prepared data. Using the two-way contingency table of multinomial numerical values, the prediction engine 109 can perform correspondence analysis using the trend recognition engine 107 by mapping the pixels movement data from n-1 dimension to 2-dimension such that pixels which belong to the similar object movement will be close to each other than those have dissimilar motion. Now, the prediction engine 109 can apply the clustering methods (distance based and/or density based methods) to cluster the pixels using the clustering engine 108, wherein all pixels within each cluster will be representing a similar trend.

The worker nodes 105 can store data such as the clustered data, the discovered rules, the raw transactional data logs, in the distributed memory 106.

In an embodiment herein, the first data repository 103 and the distributed memory 106 can be separate data repositories. In an embodiment herein, the first data repository 103 and the distributed memory 106 can be the same data repository.

Figure 2A:
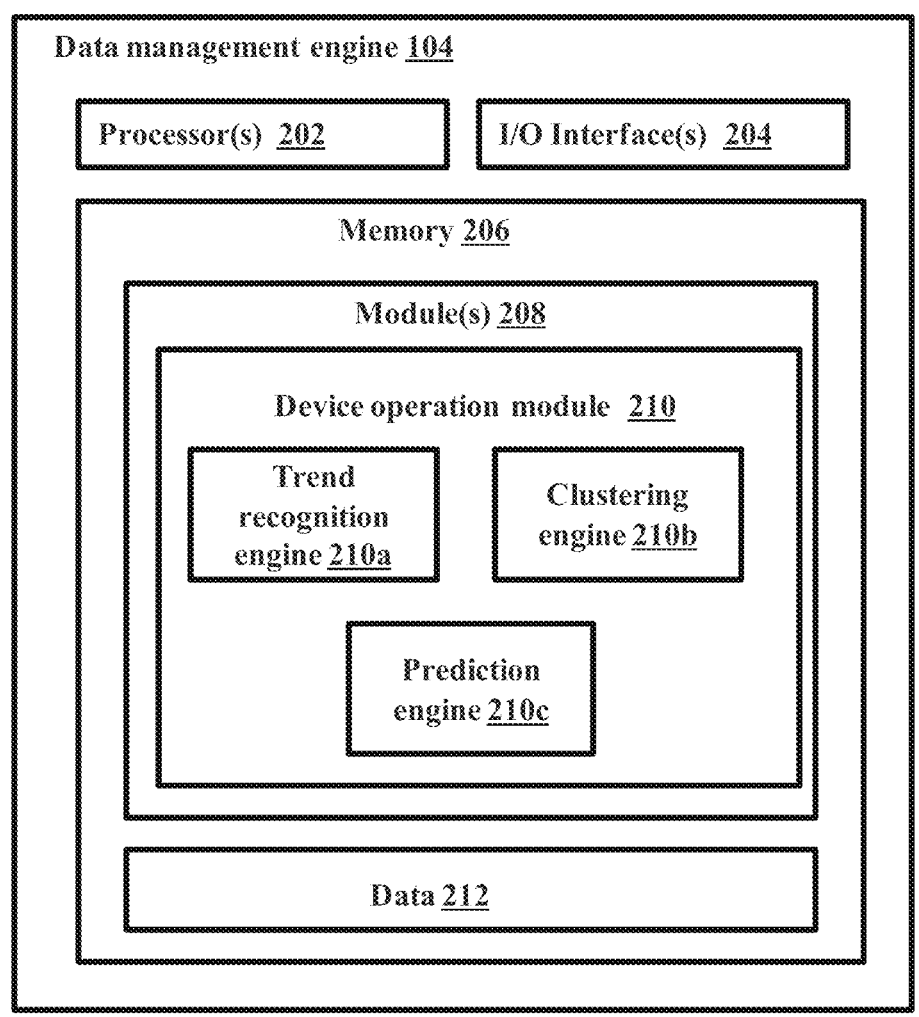
FIGS. 2a, 2b, 2c and 2d illustrates a plurality of components of the data management engine, according to the embodiments as disclosed herein.

FIGS. 2a, 2b, 2c and 2d illustrates a plurality of components of the data management engine. Referring to FIG. 2a, the data management engine 104 is illustrated in accordance with an embodiment of the present subject matter. In an embodiment, the data management engine 104 may include at least one processor 202, an input/output (I/O) interface 204 (herein a configurable user interface), and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface such as a display screen, a camera interface for the camera sensor (such as the back camera and the front camera on the data management engine 104), and the like.

The I/O interface 204 may allow the data management engine 104 to communicate with other devices. The I/O interface 204 may facilitate multiple communications within a wide variety of networks and protocol types, including wired networks, for example, Local Area network (LAN), cable, etc., and wireless networks, such as Wireless LAN, cellular, Device to Device (D2D) communication network, Wi-Fi networks and so on. The modules 208 include routines, programs, objects, components, data structures, and so on, which perform particular tasks, functions or implement particular abstract data types. In one implementation, the modules 208 may include a device operation module 210. The device operation module 210 can be configured for detection and classification of data trends using correspondence analysis. The device operation module 210 can be configured to execute one or more tasks corresponding to the application on the data management engine 104 in accordance with embodiments as disclosed herein.

Figure 2B:
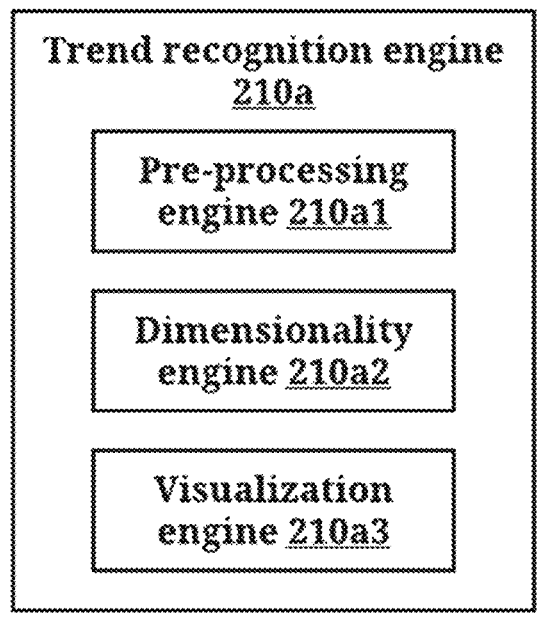
Figure 2C:
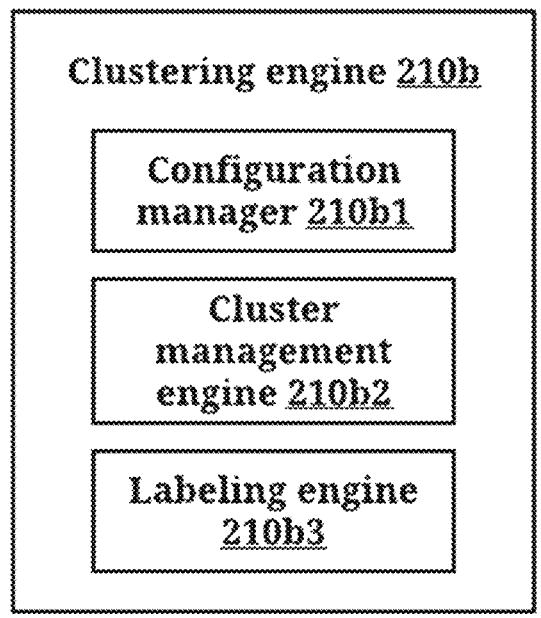
Figure 2D:
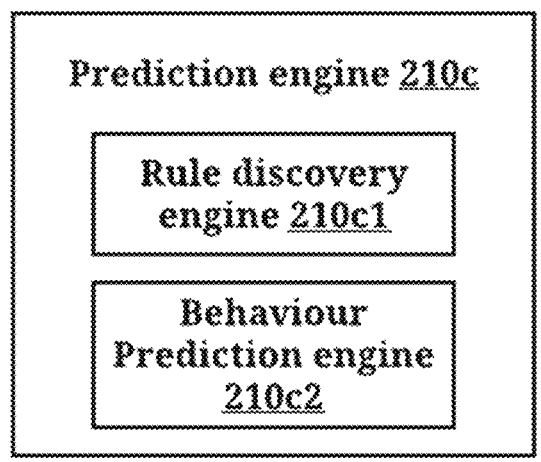

The device operation module 210 can comprise of a trend recognition engine 210a, a clustering engine 210b, and a prediction engine 210c. The trend recognition engine 210a can comprise of a pre-processing engine 210a1, a dimensionality engine 210a2, and a visualization engine 210a3 (as depicted in FIG. 2b). The clustering engine 210b can comprise of a configuration manager 210b1, a cluster management engine 210b2, and a labeling engine 210b3 (as depicted in FIG. 2c). The prediction engine 210c can comprise of a rule discovery engine 210c1, and a behaviour prediction engine 210c2 (as depicted in FIG. 2d).

The pre-processing engine 210a1 can obtain the raw data from the first data repository 103, wherein the raw data can correspond to a particular domain. For example, the domain may include, but is not limited to, a telecommunications network, a banking system, a video surveillance system, and so on. Each of the data points in the raw data can have a subject numerical value of the attribute at each time instance. The pre-processing engine 210a1 can perform pre-processing and feature selection on the raw data. In an embodiment, the preprocessing and feature selection on the raw data comprises determining the attributes of the users, objects, and so on, present in the data.

In the example of the data being related to users in a telecommunications network, an example of the attribute of the user can be minutes of usage. Further, the pre-processing engine 210a1 can obtain the trending data from the raw transactional logs. The trending data can include the values that change over time. The pre-processing engine 210a1 can form the correspondence table using the raw data, wherein the rows of the correspondence table represent an instance (such as a subscriber) and the columns of the correspondence table will be the observations of a single variable over time at different time instances (such as call characteristics, usage characteristics, revenue, and so on).

The dimensionality engine 210a2 can reduce the dimensionality of the data format of the raw data, when the feature selection and trending data are obtained from the raw transactional logs, using the correspondence table. In an embodiment, the dimensionality engine 210a2 can use the correspondence table to identify the trend of data on the basis of their numerical attributes. After dimensionality reduction, the new coordinates will be such that the data with similar trends in the original high dimensional time series domain will become closer to each other than that those who are dissimilar. In an example, consider users were in t-dimensional space, if the data can be mapped from t to a pre-defined number of dimensions without losing much information about the trend of the users, then it will be easily interpretable and efficiently represented in comparison to the data in t-dimensions, wherein t is greater than the pre-defined number of dimensions.

The dimensionality engine 210a2 can apply correspondence analysis when the trend of high dimensional user data with numerical multidimensional attributes of time series domain is processed. The dimensionality engine 210a2 can use correspondence analysis to determine similarities and differences among the trends of data with respect to their behavior over time and depicting the same graphically in a low-dimensional space. The dimensionality engine 210a2 can use correspondence analysis to assign each data point a coordinate in the lower dimension maintaining the similarity, difference and the relationship between the variables in rows and columns of the correspondence table, which means those rows which are similar in their trend will be close to each other in the new low dimensional space and those which are dissimilar will be some far apart. The dimensionality engine 210a2 can perform correspondence analysis based on the Eigen value of a matrix representing the correspondence table, so it can be used for dimensionality reduction similar to principal component analysis, which enables an easier interpretation of results.

In an embodiment, the dimensionality engine 210a2 can obtain the number of target dimensions (for example, it can be 2-dimensional or 3-dimensional based on the requirement) as an input for reducing the dimensionality of the data.

The visualization engine 210a3 can graphically visualize the similarity between data points in the new low dimensional space. The visualization engine 210a3 can enable visualization of trends identified in the dimensionally reduced data. The visualization engine 210a3 can also verify the dimensionally reduced data.

The configuration manager 210b1 can be used to manage the configuration of the data with a lower dimension. The configuration manager 210b1 can configure the clusters, the labels, and so on.

Once the dimensionality of the data is reduced using correspondence analysis, the cluster management engine 210b2 can perform the clustering of the users in the lower dimensional space based on parameters to obtain unlabeled clusters based on trend similarity. Clustering of the users is performed to group the users having similar trends. In an embodiment, the cluster management engine 210b2 can obtain the clustering parameters for performing clustering of the users based on configuration parameters.

The cluster management engine 210b2 can perform clustering using distance-based clustering (such as K-means) and/or density based clustering (such as DBSCAN) based on user specified hyper parameters/configuration parameters (e.g. number of expected clusters K in K-means, minimum points required to form a cluster in the case of DBSCAN, and so on). The cluster management engine 210b2 can persist summaries corresponding to each of the discovered clusters. For instance, in the case of K-means, the mean and covariance corresponding to each cluster is maintained in a distributed file in the distributed memory 106.

In an embodiment, the cluster management engine 210b2 can use clustering techniques for grouping the similar trends of the users in the lower dimension such that the users with similar trends will be grouped in the same cluster. The cluster management engine 210b2 can first apply a density based clustering to obtain (501) density based clusters, wherein users whose trend differs from the majority of the users can be considered as noise because of their lesser density. To avoid loss of this data, the cluster management engine 210b2 can further cluster the noise using distance based clustering, before the final clusters are obtained (503) (as depicted in FIG. 5). The clusters formed in lower dimensions can retain the properties (similarities, differences and relationships), which were there in the n dimensional space.

As the lower dimensional representation of the instances capture the actual behavior trends associated with them in the original space, the discovered clusters members are likely to exhibit similar traits. Some of the newly discovered clusters may be similar to already existing clusters. Moreover, the cluster membership of existing instances might change due to the emergence of new clusters. To accommodate these aspects, the cluster management engine 210b2 can update the clusters by initiating a cluster merging and instance reassignment process at pre-defined intervals or on pre-defined events occurring (such as data reaching a pre-defined size, and so on) or manually.

The cluster management engine 210b2 can determine similarity among clusters using a suitable distance metric such as Euclidean distance, Cosine distance or Manhattan distance on the corresponding cluster summary representation. Lower distances among a pair of clusters indicate higher similarity. The cluster management engine 210b2 can merge the clusters. Each worker node can calculate the similarity among all pair of clusters within its subset of clusters and record it into the distributed memory 106 if the similarity is greater than a user specified threshold (to indicate that the cluster pair is a potential candidate for merging). The cluster management engine 210b2 can perform cluster merging process by recalculating the cluster summary representation (for example, the mean and the covariance) corresponding to each pair of merging clusters, after considering all the instances belonging to both the clusters that are being merged. After performing cluster merging, the cluster management engine 210b2 can perform instance reassignment and cluster summary recalculation, to keep the clusters up to date.

In an embodiment herein, the cluster management engine 210b2 can operate in a distributed manner, wherein each worker node can be assigned a subset of clusters among which the similarity needs to be calculated. In an embodiment herein, the cluster management engine 210b2 can assign the task of merging the most similar cluster pairs to one or more worker nodes, after identifying them.

Based on the trend similarity with the labeled samples, the labeling engine 210b3 can assign labels to the clusters, based on label information of the data according to historical data (which may be present in at least one of the first data repository 103 and the distributed memory 106). The cluster management engine 210b2 can further divide the clusters into classes based on at least one other feature and the cluster management engine 210b2 can assign each user in the cluster to be a member of at least one class. The cluster management engine 210b2 can assign a confidence level to the data points for each predicted action, based on the class to which they belong.

In an embodiment herein, members within a cluster can be associated with multiple labels and each of the clusters can also have multiple labels assigned. In an embodiment herein, the labeling engine 210b3 can use user specified thresholds for assigning labels; for example, at least 30% of samples within the cluster should have a particular label for assigning that label to the cluster.

In case of unlabeled clusters, due to lack of sufficient number of labeled samples within the unlabeled clusters, the labeling engine 210b3 can utilize similarity of the cluster with other clusters for labeling, using a voting scheme. The labeling engine 210b3 can assign a vote to each sample within a cluster for its label, which will have a unit weight.

The labeling engine 210*b*3 can further assign votes to labeled samples from other clusters (having a similarity value higher than a user specified threshold) for its labels proportional to the similarity value with the current cluster. The labeling engine 210*b*3 can calculate total votes accumulated for each label after normalization. Normalization can comprise of the labeling engine 210*b*3 scaling total number of samples in the similar clusters proportional to the similarity value with the current cluster. This voting scheme is used to resolve label conflicts among clusters by considering similarity among pairs of clusters.

The labeling engine 210*b*3 can assign one or more relationship attributes to the clusters. The relationship attributes can be assigned based on the relation between the clusters, and their similarity to each other. The labeling engine 210*b*3 can determine frequency of the labels among the clusters and update the relationship attribute based on the determined frequency of the labels.

The labeling engine 210*b*3 can assign tasks (such as data aggregation, and so on) to one or more worker nodes 105 for executing the task in a distributed fashion. For instance, the labeling engine 210*b*3 can provide instructions to the respective worker nodes 105 and the worker nodes 105 can calculate the total votes accumulated for a label based on instances assigned to it. On calculating the accumulated votes, the worker nodes 105 can notify the data management engine and the labeling engine 210*b*3 can aggregate the total votes accumulated for the label from all the worker nodes.

The prediction engine 210*c* enables at least one application such as optimizing campaigns, performing product bundling, predicting churn and video surveillance using at least one rule discovered from past data by the rule discovery engine 210*c*1.

The rule discovery engine 210*c*1 can further apply association rule mining on the samples and/or clusters with/without labels. The rule discovery engine 210*c*1 can further use the discovered rules for user targeted applications, such as optimizing advertising campaigns, performing product bundling, pricing, churn prediction, video surveillance, and so on.

Further, the behaviour prediction engine 210*c*2 can predict the future data based on the trends of attributes that are observed in the labeled samples. In an embodiment, the behaviour prediction engine 210*c*2 can forecast the future data, based on the past trends of attribute values that are observed in the case of labeled samples. The prediction may be in the form of rules consisting of predicates and relationships among them along with augmented statistics such as confidence measures, indicating a degree of algorithmic confidence on each rule.

For example, if there is a churn file that lists the users who are churned, the behaviour prediction engine 210*c*2 can use the trends exhibited by these users prior to churning to label other users who exhibit similar trends as potential churn candidates. Further, there can be multiple labeled lists corresponding to user actions that are observed in the past (for example churning, postpaid to prepaid switching and so on). In each of the unlabeled clusters that emerge, the behaviour prediction engine 210*c*2 can identify the number of labeled users from a particular list being present. Having more users from a labeled list (representing a class) in a cluster is a strong indication that the cluster likely represents the group of users who could potentially exhibit the same behavior.

Considering an example of processing video, it may be required to do unsupervised segmentation of objects in a video based on their similarity of their motion may be for safety management of large gathering (big crowd) in the public area, to get the moving areas in the scene for efficient video compression, to detect unusual events, video surveillance or to analyze it further for specific purposes.

For finding trend of object movement in a video, the device operation module 210 can use the magnitude of the pixel movement over frames as an attribute of the trend recognition. The device operation module 210 can use the optical flow to find the pattern of apparent motion of objects, surfaces, and edges in a visual scene caused by the relative motion between an observer and the scene. The device operation module 210 can use the optical flow to get the subsequent position of the pixels from frame to frame. The device operation module 210 can determine the optical flow as follows; if a pixel was at (u1, v1) position in one frame and the pixel moves to (u2, v2) position in the next frame then the magnitude of its movement can be calculated as $$\Delta = \sqrt{(1-2)^2 + (1-2)^2}$$

For video segmentation based on trend of object movement, embodiments herein consider that those objects that are following same trend in a video will also represent same trend in their magnitude of their displacement from frame to frame. On determining the optical flow, the device operation module 210 can calculate the magnitude of pixels displacement consecutively over all n frames, which results the trend of pixels in time series over (n-1)-dimension(s).

The device operation module 210 can build a two-way contingency table of multinomial numerical values. The device operation module 210 can find the similarity and the differences between the trends of motion of all pixels from frame to frame and can cluster objects having similar movement. So, the device operation module 210 can apply the trend recognition model on the prepared data. Using the two-way contingency table of multinomial numerical values, the device operation module 210 can perform correspondence analysis by mapping the pixels movement data from n-1 dimension to 2-dimension such that pixels which belong to the similar object movement will be close to each other than those have dissimilar motion. Now, the device operation module 210 can apply the clustering methods (distance based and/or density based methods) to cluster the pixels, wherein all pixels within each cluster will be representing a similar trend.

The modules 205 may include programs or coded instructions that supplement applications and functions of the data management engine 104. The data 212, amongst other things, serves as a repository for storing data processed, received, and generated by one or more of the modules 208. Further, the names of the other components and modules of the data management engine 104 are illustrative and need not be construed as a limitation.

FIG. 3 illustrates a flow diagram explaining the various steps involved in predicting the user behavior trends using the correspondence analysis, according to the embodiments as disclosed herein. As depicted in the flow diagram 300, initially raw data is obtained (301) from the raw transaction aggregator 101 directly or via the data repository 103.

The data format which is used herein as an example is U=1, 2, 3 . . . , u subjects, for each subject numerical value of the attribute at each time instance T=1, 2, 3 . . . , t is measured. Table 1 depicts an example of the correspondence table (as depicted below).

TABLE 1

|       | T1  | T2  | T3  | T4  | ... | ... | Tt  |
|-------|-----|-----|-----|-----|-----|-----|-----|
| User1 | X11 | X12 | X13 | X14 | ... | ... | X1t |
| User2 | X21 | X22 | X23 | X24 | ... | ... | X2t |
| ...   | ... | ... | ... | ... | ... | ... | ... |
| ...   | ... | ... | ... | ... | ... | ... | ... |
| ...   | ... | ... | ... | ... | ... | ... | ... |
| Useru | Xu1 | Xu2 | Xu3 | Xu4 | ... | ... | Xut |

Here $X_{ij}$ can be value of any numerical attribute observed at different time instances. Data in this case is of u*t dimension or each subject is measured in t-dimensional space.

Once the transactional data (raw data) is obtained, preprocessing and feature selection is performed (302) on the raw data. In an embodiment, the preprocessing and feature selection on the raw data comprises determining the attributes of the data points. In an example herein, one such attribute of the user can be minutes of usage (may be usage of a network in telecommunications domain).

Figure 4:
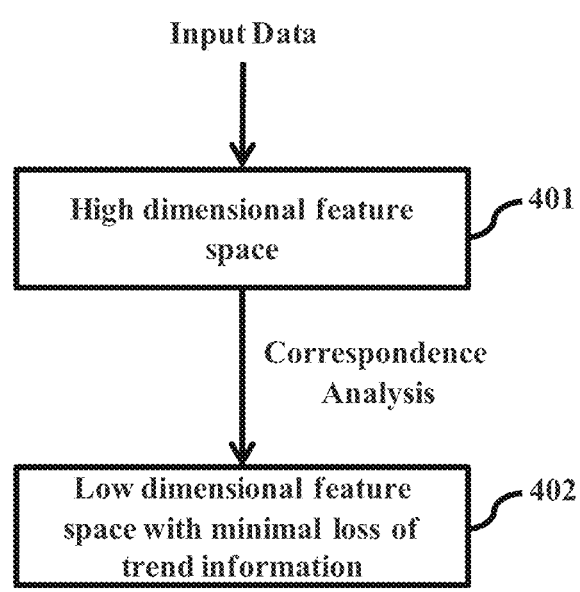
FIG. 4 depicts the process of reducing the dimensions of data, according to embodiments as disclosed herein.

Further, trending data is obtained (303) from the raw transactional logs. The trending data includes the values that change over time. Further, the dimensionality of the data format of the raw data is reduced (304), when the feature selection and trending data are obtained from the correspondence table using correspondence analysis (401, 402) (as depicted in FIG. 4). Correspondence analysis is used to recognize the trend of data points on the basis of their numerical attributes. After dimensionality reduction, the new coordinates will be such that those data points following similar trend in the original high dimensional time series domain will become closer to each other than that those which are dissimilar. In an example, consider that the subscriber data points were in t-dimensional space, if the data can be mapped from t to 2 or 3-dimensional space without losing much information about the trend of the subscribers, then it will be easily interpretable and analyzable and efficiently represented in comparison to the data in t-dimensions. Correspondence analysis is applied in applications where the trend of high dimensional data with numerical multinomial attributes of time series domain is required. Correspondence analysis can be used to determine similarities and differences among the trends of the data with respect to their behavior over time and depict the same graphically in a low-dimensional space. Correspondence analysis can be used to assign each user a coordinate in the lower dimension maintaining the similarity, difference and the relationship between the variables in rows and columns of the table, which means those rows which are similar in their trend will be close to each other in the new low dimensional space and those which are dissimilar will be some far apart. Correspondence analysis is based on the Eigen value of a matrix, so it can be used for dimension reduction similar to principal component analysis, which enables an easier interpretation of results. The similarity between users in the new low dimensional space can be graphically visualized.

For applying correspondence analysis, the correspondence table is generated, wherein each column of the table represents a numerical attribute and all the columns will be the observations of the same variable over time at different time instances. The number of target dimensions (for example, it can be 2-dimensional or 3-dimensional based on the requirement) can be used as an input.

Once the dimensionality of the data is reduced using correspondence analysis, the clustering of the data attributes is performed (305) to group the data points having similar trends based on parameters to obtain unlabeled clusters based on trend similarity. In an embodiment, the method obtains clustering parameters for performing clustering of the data points based on configuration parameters. In an embodiment, clustering techniques such as density based clustering and/or distance based clustering can be used for grouping the similar trends of the data points in the lower dimension such that the data points with similar trends will be grouped in the same cluster.

First the density based clustering can be used to obtain (501) density based clusters. Density based clustering considers users whose trend differs from the majority of the users as noise because of their lesser density. To avoid loss of this data, the noise is further clustered (502) using distance based clustering, before the final clusters are obtained (503) (as depicted in FIG. 5). The clusters formed in lower dimension retain the properties (similarities, differences and relationships), which were there in the n dimensional space.

Based on the trend similarity with the labeled samples, labels are assigned (306) to the clusters based on label information of the data according to historical data. The clusters may be further divided into classes based on at least one other feature and each data point in the cluster may be assigned to be a member of at least one class. The data points may be then assigned a confidence level for each predicted action, based on the class to which they belong.

Further, the future data trends are predicted (307) based on the trends of attributes that are observed in the case of labeled samples. In an embodiment, the prediction step forecasts the future trends, based on the past trends of attribute values that are observed in the case of labeled samples. The prediction may be in the form of rules consisting of predicates and relationships among them along with augmented statistics such as confidence measures, indicating a degree of algorithmic confidence on each rule.

For example, consider that there is a churn file that lists the users who are churned, and could make use of the trends exhibited by these users prior to churning to label other users who exhibit similar trends as potential churn candidates. Further, there can be multiple labeled lists corresponding to user actions that are observed in the past (for example churning, postpaid to prepaid switching and so on). In each of the unlabeled clusters that emerge, the number of labeled users can be identified from a particular list being present. Having more users from a labeled list (representing a class) in a cluster is a strong indication that the cluster likely represents the group of users who could potentially exhibit the same behavior.

In an embodiment herein, the above mentioned functions may be performed by the data management engine 104 alone. In an embodiment herein, the above mentioned functions may be performed by a combination of the data management engine 104 and one or more worker nodes 105, wherein the data management engine 104 assigns one or more steps as disclosed above to the one or more worker nodes. In an embodiment herein, the above mentioned functions may be performed by one or more worker nodes 105, wherein the data management engine 104 assigns the steps as disclosed above to the one or more worker nodes. The various actions in flow diagram 300 may be performed in the order presented, in a different order or simultaneously. Further, in some embodiments, some actions listed in FIG. 3 may be omitted.

FIG. 6 is a flowchart illustrating an example process of optimizing campaigns and performing product bundling for a user based on clusters, according to embodiments as disclosed herein. After the formation of clusters in lower dimensional space, association rule mining can be applied on each of these clusters, and thereby the discovered rules can be used automatically for user targeted applications, such as optimizing advertising campaigns, performing product bundling, pricing and so on. Association rule mining can be used for discovering interesting relations between variables in large databases. It finds complete association from all the items to the others given historical purchase data (market-basket analysis). For example, if most people who buy bread and milk also tend to buy butter, a rule: "milk, bread->butter [support=5%, confidence=100%]" may be discovered. To ensure the relevance of the discovered rules, two hyper-parameters namely support and confidence threshold can be defined manually. Support of an item set is the fraction of all purchases in which that item set appears (e.g. if there are 100 purchases (each purchase may contain multiple items such as bread, jam, butter, oil, juice, milk etc.), if 20 of the purchases had bread as well as butter, then support of bread->butter is 20%). Confidence is the fraction of purchases in which two items appear together to the total number of purchases for the 2nd item (e.g. confidence of bread->butter will be 1.0 if out of all purchases of bread, butter is also purchased together with it). Only those rules having support and confidence value above the specified threshold will be presented to the user, and considered for subsequent downstream processing. Tasks related to association rule mining (such as data aggregation) can be assigned to worker nodes for executing the task in a distributed fashion. For instance, each worker node calculates the total frequency accumulated for an itemset (e.g. bread, butter and milk), and the data management engine aggregates the total frequency of each itemset from all the worker nodes.

After the formation of clusters in lower dimensional space, using other features of users within the clusters and the campaigns which historically were sent to them, the relationships between features of users within the cluster (wherein examples of the features may be the ARPU of the user, the number of SMSs sent by the user, the number of international calls made by the user and so on) and features of user who were previously converted by previously run campaigns are discovered (601). The underlying hidden rules in the relationships are mined (602) using association rule mining. The obtained rules are combined (603) to suggest user targeted applications, such as optimizing advertising campaigns, performing product bundling, pricing and so on. In an embodiment, the discovered rules are matched with the user attributes, to identify one or more subsets of users qualifying the rules, within each cluster. The discovered rules can be maintained within a distributed file, with each worker node having access to all the rules. Each worker node checks each rules against the subset of users belonging to its data split, and creates a list of users qualifying the rules. This list is maintained as a distributed file. User targeted applications such as discovering/augmenting target criteria of campaigns utilize the aforementioned list. Campaign attributes could be diverse, including target criteria, offer to be attached, channel of promotion (e.g. SMS (Short Messaging Service), out bound dialing, mobile app, and so on), promotion delivery time, and so on. Conversion of a user for a particular campaign (user accepting the "call to action" in the campaign) associates the attributes of the corresponding campaign to the corresponding user as "labels". In an embodiment, the data management engine 104 utilizes distributed worker nodes to calculate frequency of labels associated with each campaign's target set of users (data aggregation) to automatically update (which can include providing recommendation(s) and/or modification(s)) campaign attributes based on heuristics (for example, the offer attached to a campaign is modified to the one corresponding to the label with maximum frequency).

In an embodiment herein, the above mentioned functions may be performed by the data management engine 104 alone. In an embodiment herein, the above mentioned functions may be performed by a combination of the data management engine 104 and one or more worker nodes 105, wherein the data management engine 104 assigns one or more steps as disclosed above to the one or more worker nodes. In an embodiment herein, the above mentioned functions may be performed by one or more worker nodes 105, wherein the data management engine 104 assigns the steps as disclosed above to the one or more worker nodes.

In an example, each attribute of users is discretized into bins (e.g. ARPU (Average Revenue Per User) can be high, medium and low). Now each conversion for each campaign can be treated like a "purchase". Corresponding to each campaign, top association rules are mined. Now, within each cluster, conversion information corresponding to several campaigns can be obtained. Now the discovered rules can be ranked based on how many times they occur within the cluster and then top ranking rules would be combined to generate new rules, which can be the basis for designing a new campaign or optimizing an existing campaign.

The various actions in flow diagram 600 may be performed in the order presented, in a different order or simultaneously. Further, in some embodiments, some actions listed in FIG. 6 may be omitted.

Figure 7A:
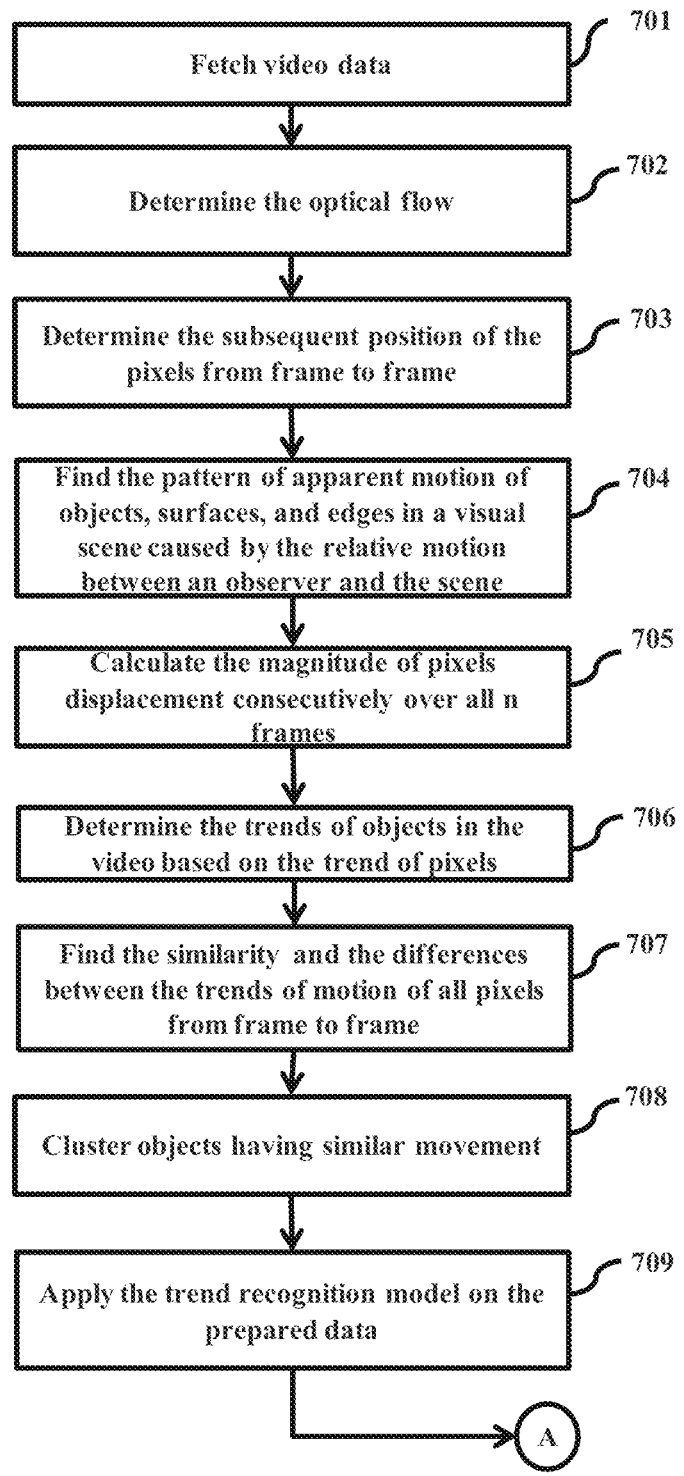
FIGS. 7a and 7b are flowcharts depicting the process of predicting trends in videos, according to embodiments as disclosed herein.
Figure 7B:
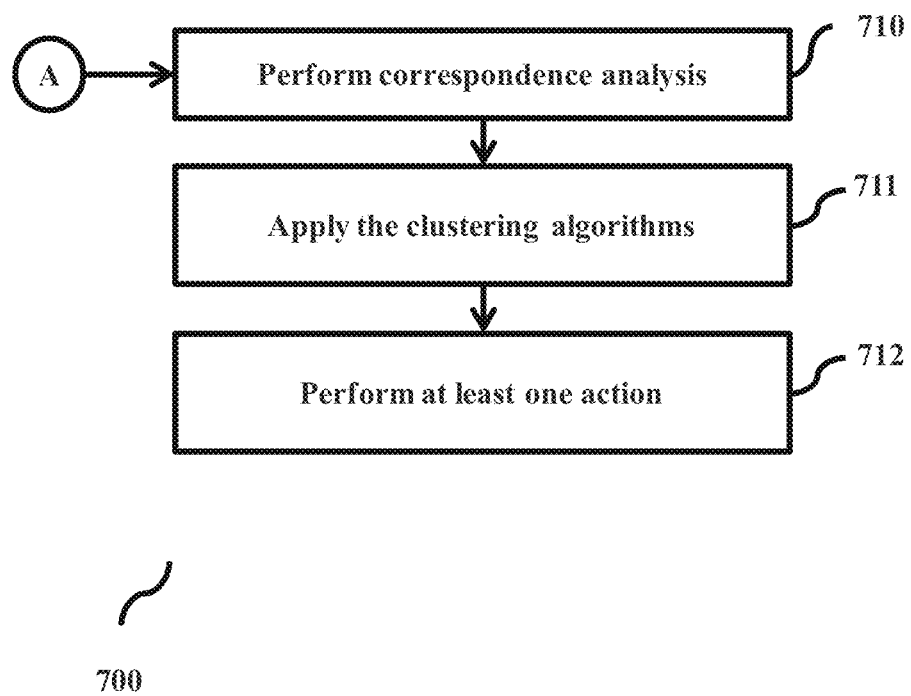

FIGS. 7a and 7b are flowcharts depicting an example process of predicting trends in videos. Video data is fetched (701) from the first data repository 103. The video data stored in the first data repository 103 can be real-time data and/or historical data. The data can be from one or more devices, which can capture video. The fetched video data can comprise of a plurality of frames. The optical flow of the video data is determined (702), wherein the optical flow can be used to find the pattern of apparent motion of objects, surfaces, and edges in a visual scene caused by the relative motion between an observer and the scene. The optical flow can be determined by determining the magnitude of movement as the square root of the sum of squares of differences between the respective coordinates of the positions of the object in two different frames. For example, if a pixel was at (u1, v1) position in one frame and the pixel moves to (u2, v2) position in the next frame then the magnitude of its movement can be calculated as $$\Delta = \sqrt{(1-2)^2 + (1-2)^2}$$

The subsequent position of the pixels from frame to frame is determined (703) and the pattern of apparent motion of objects, surfaces, and edges in a visual scene caused by the relative motion between an observer and the scene is found (704), using the determined optical flow. This can be based on the magnitude of the pixel movement over frames. The optical flow can be used to find the pattern of apparent motion of objects, surfaces, and edges in a visual scene caused by the relative motion between an observer and the scene. The magnitude of pixel displacement consecutively over all n frames is calculated (705), which results the trend of pixels in time series over (n-1) dimension(s), wherein the pixel movement can indicate movement of one or more objects present in the video. The trends of objects in the video is determined (706) based on the trend of pixels, wherein it can be considered that those objects that are following same trend in a video will also represent same trend in their magnitude of their displacement from frame to frame. The correspondence table is built. The similarity and the differences between the trends of motion of all pixels from frame to frame is determined (707) and objects having similar movement are clustered (708). The trend recognition model is applied (709) on the prepared data. Using the two-way contingency table of multinomial numerical values, the correspondence analysis is performed (710) by mapping the pixels movement data from n-1 dimension to 2-dimension such that pixels that belong to the similar object movement will be closer to each other than those having dissimilar motion. Now, the clustering algorithms to cluster the pixels is applied (711), wherein all pixels within each cluster will be representing a similar trend. Based on the clustering, at least one action is performed (712), such as determining objects that may cause a stampede, detect unusual events/objects, compress video, and so on.

In an embodiment herein, the above mentioned functions may be performed by the data management engine 104 alone. In an embodiment herein, the above mentioned functions may be performed by a combination of the data management engine 104 and one or more worker nodes 105, wherein the data management engine 104 assigns one or more steps as disclosed above to the one or more worker nodes. In an embodiment herein, the above mentioned functions may be performed by one or more worker nodes 105, wherein the data management engine 104 assigns the steps as disclosed above to the one or more worker nodes. The various actions in flow diagram 700 may be performed in the order presented, in a different order or simultaneously. Further, in some embodiments, some actions listed in FIGS. 7a and 7b may be omitted.

Figure 8:
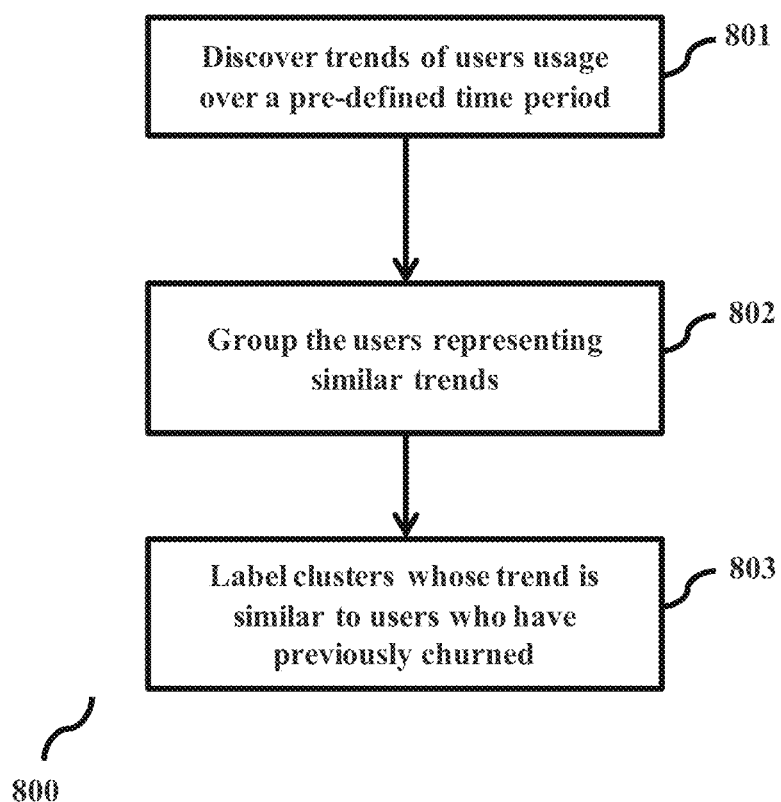
FIG. 8 is a flowchart depicting an example process of predicting churn among users in a telecommunications network, according to embodiments as disclosed herein.

FIG. 8 is a flowchart depicting an example process of predicting churn among users in a telecommunications network. In telecommunications, churning of users (changing your service provider) is a problem. Operators always want to predict users who may churn in near future so that some corrective actions can be taken to reduce churn and improve loyalty. Embodiments herein can find similarity between trends of mobile usage of churning users and other customers. Embodiments herein can predict customers who may churn in near future.

Embodiments herein can find a trend of mobile usage of those users, which are actually churned and predict the behavior of users with similar trends. For example, if 11 weeks data for 8 customers is available. Users 1 to 5 are those who are actually churned. Embodiments herein can find the trend of the churning users (users 1-5) so that all the users whose trend is similar to these users who have churned (users 1-5) can be predicted.

The trends of the usage of users over a pre-defined time period is discovered (801) (which can be in the range months and/or weeks) using correspondence analysis. The users representing similar trends are grouped (802) using clustering algorithm(s) (comprising of density based clustering and/or distance based clustering). The clusters whose trend is similar to users who have previously churned are labeled (803). In an embodiment herein, the above mentioned functions may be performed by the data management engine 104 alone. In an embodiment herein, the above mentioned functions may be performed by a combination of the data management engine 104 and one or more worker nodes 105, wherein the data management engine 104 assigns one or more steps as disclosed above to the one or more worker nodes. In an embodiment herein, the above mentioned functions may be performed by one or more worker nodes 105, wherein the data management engine 104 assigns the steps as disclosed above to the one or more worker nodes. The various actions in flow diagram 800 may be performed in the order presented, in a different order or simultaneously. Further, in some embodiments, some actions listed in FIG. 8 may be omitted.

Figure 9:
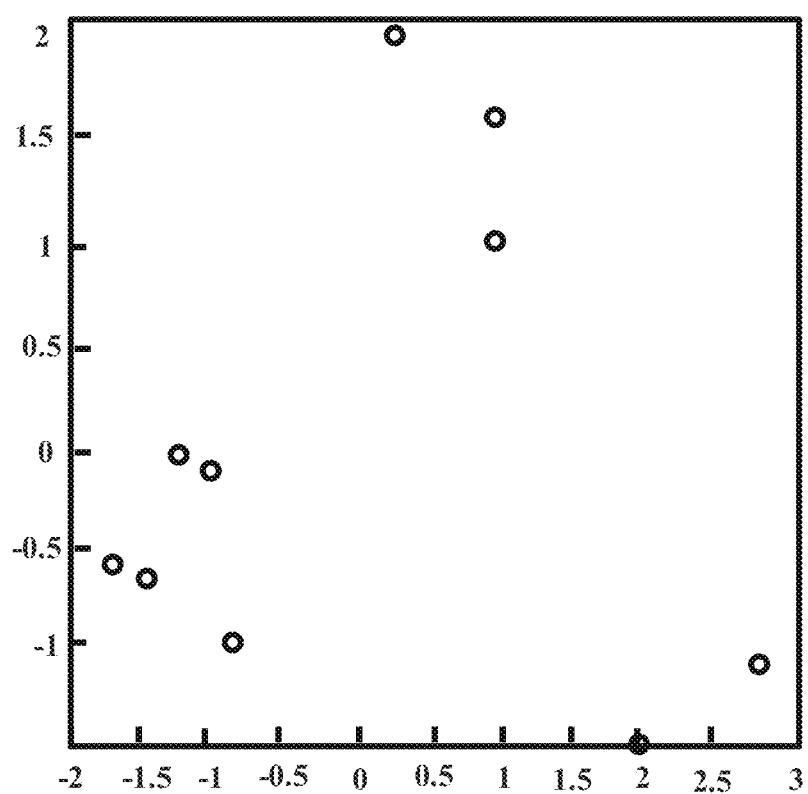
FIG. 9 is a graph showing the representation of users in a low dimensional feature space, according to the embodiments as disclosed herein.

FIG. 9 is a graph showing an example scenario where users are represented in a low dimensional feature space, according to the embodiments as disclosed herein. The graph shown in the figure depicts a two dimensional feature space with X and Y axes. The graph can be obtained by reducing the n-dimensional feature space by applying the correspondence analysis on the numerical time series data.

Considering a sample of ten users in a telecom network as an example. The transactional data of all the ten users are recorded in the telecom network. The transactional data (raw data) of all the users is represented using U=1, 2, 3 . . . u users, for each user, numerical value of the attribute at each time instance T=1, 2, 3 . . . t is measured. This model of representing each user's numerical value of the attribute at each time instances forms a multinomial data or an array having n-dimensions (for example u x n).

The first step involved in classification and detection of user behavior trends using correspondence analysis is the reduction of n-dimensional space to lower dimensional space.

The dimensionality reduction of the multinomial data is performed for easy processing and interpretation of data without losing trend information of each user. The multinomial data can be reduced to lower dimension (for example 2-dimensional or 3-dimensional based on the requirement). In the lower dimensional feature space (2-dimensional as in the graph), the new coordinates (as shown in the graph) will be such that those users who are following similar trend in the multidimensional time series domain will become closer to each other than those who are dissimilar as shown in the graph.

Figure 10:
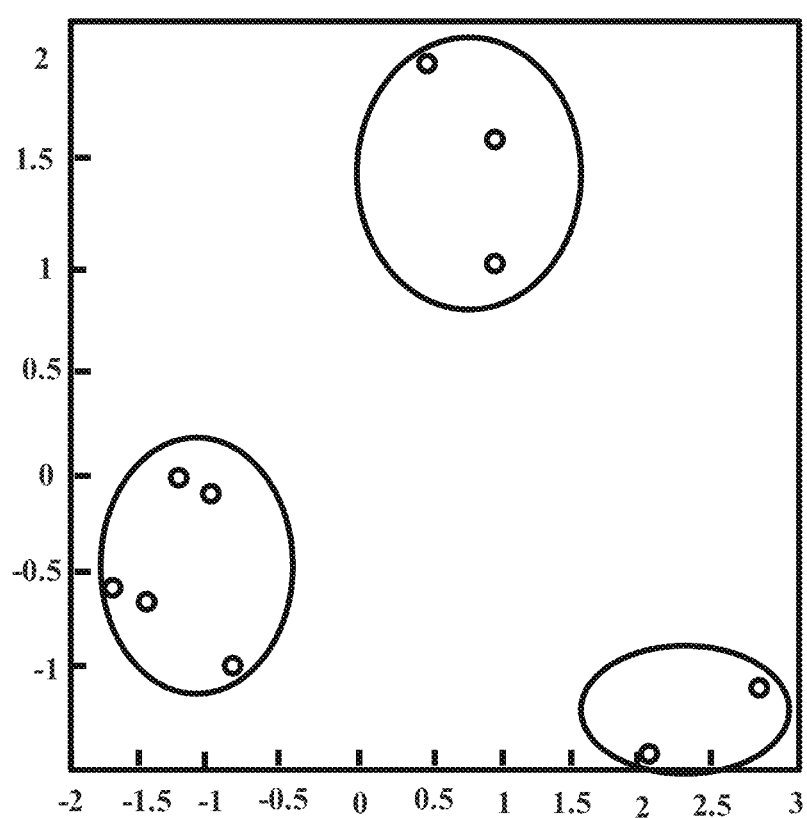
FIG. 10 is a graph showing the grouping of users having similar trends over certain time period, according to the embodiments as disclosed herein.

FIG. 10 is a graph showing an example grouping of users having similar trends over certain time period, according to the embodiments as disclosed herein. Once the multinomial data is reduced to a lower dimension (2-dimensional) as described in FIG. 4, the users of the telecom network can be grouped or clustered as shown in the graph. Clustering or grouping of the coordinates is performed based on the similar trends of the users. These groups or clusters contain the users who are similar in their trends over certain time period. These clusters are used for group based prediction or further analysis on the group.

Further, unlabeled cluster members are assigned class membership proportional to the labeled samples in the cluster. Finally, the method predicts the future actions of the users based on the past trends that are observed from the labeled clusters.

From the transactional data or historical data of the users in the telecom network, the actions performed by the users following a similar trend can be predicted. This information is used for predicting the actions of new users of similar trend.

Consider a group of 10 users (as depicted in table 2 below, which depicts the ARPU for each user) and their revenue trend.

TABLE 2

| ARPU | Month 1 | Month 2 | Month 3 | Month 4 |
|---|---|---|---|---|
| User 1 | 473.05 | 740 | 439 | 0 |
| User 2 | 247 | 100 | 99 | 0 |
| User 3 | 372 | 508 | 282 | 0 |
| User 4 | 80 | 105.1 | 55 | 30 |
| User 5 | 235 | 334 | 50 | 120.17 |
| User 6 | 409 | 309 | 9 | 500 |
| User 7 | 73.01 | 75.05 | 0 | 144.01 |
| User 8 | 105 | 176 | 129 | 509 |
| User 9 | 65 | 0 | 0 | 10 |
| User 10 | 200 | 0 | 0 | 50 |

After applying correspondence analysis on this type of numerical time series data, it is mapped to two-dimensional feature space by assigning new coordinates to the users such that those following similar trend will be close to each other in this new space as indicated in table 3.

TABLE 3

| ARPU | Dimension 1 | Dimension 2 |
|---|---|---|
| User 1 | 0.715 | 1.706 |
| User 2 | 0.14 | 1.975 |
| User 3 | 0.785 | 1.2 |
| User 4 | −0.854 | −0.967 |
| User 5 | −1.047 | −0.134 |
| User 6 | −1.488 | −0.656 |
| User 7 | −1.266 | −0.083 |
| User 8 | −1.705 | −0.622 |
| User 9 | 2.051 | −1.46 |
| User 10 | 2.6 | −0.9 |

In an example, consider that various brands based on their historical stock prices can be expressed as a time series (change in price over time). Assuming that it is required to identify brands, which are similar in terms of their stock value trends over a period of time. The dimensionality of the historical stock prices is reduced from a multi-dimensional time series data into a 2D space followed by clustering. This will result in clusters of similar brands (for example, brands like Yahoo and Amazon may fall in one cluster and so on). Once grouping is done, time series models can be learned at the cluster level (e.g. ARMA models) to make predictions of future stock values.

Figure 11B:
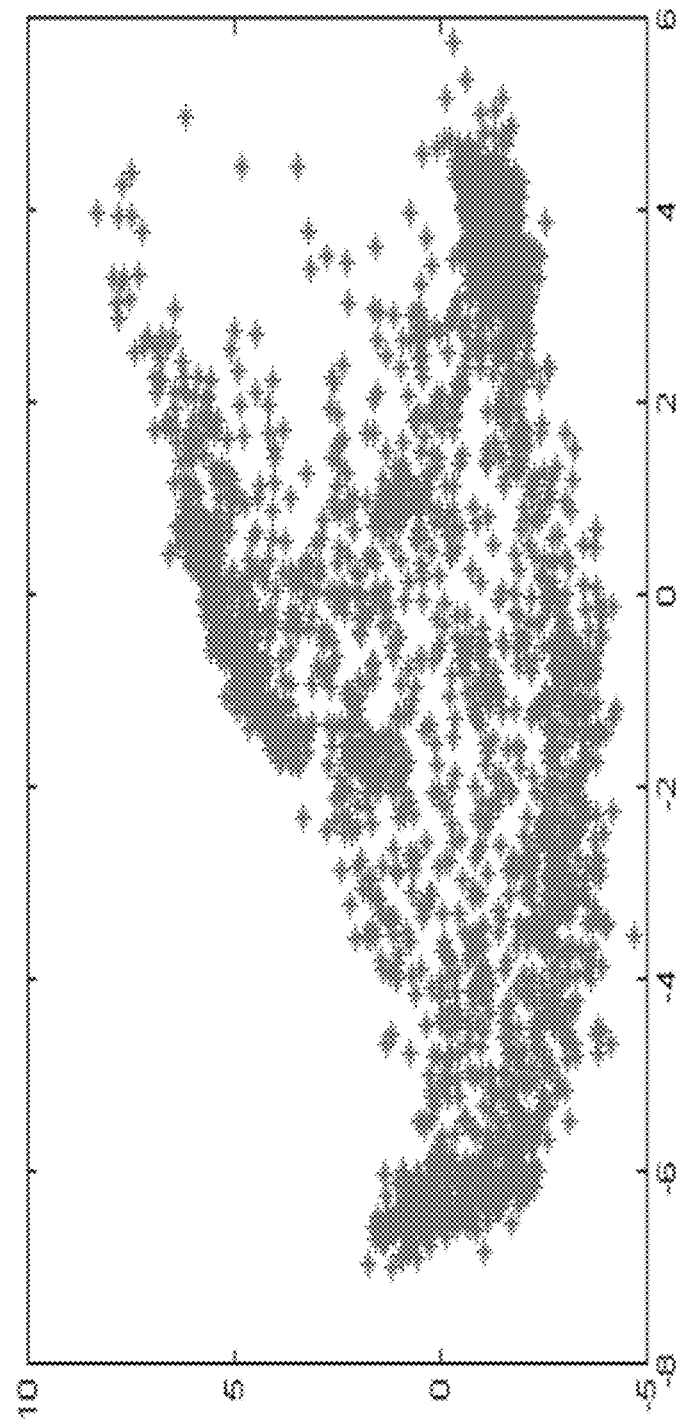
Figure 11C:
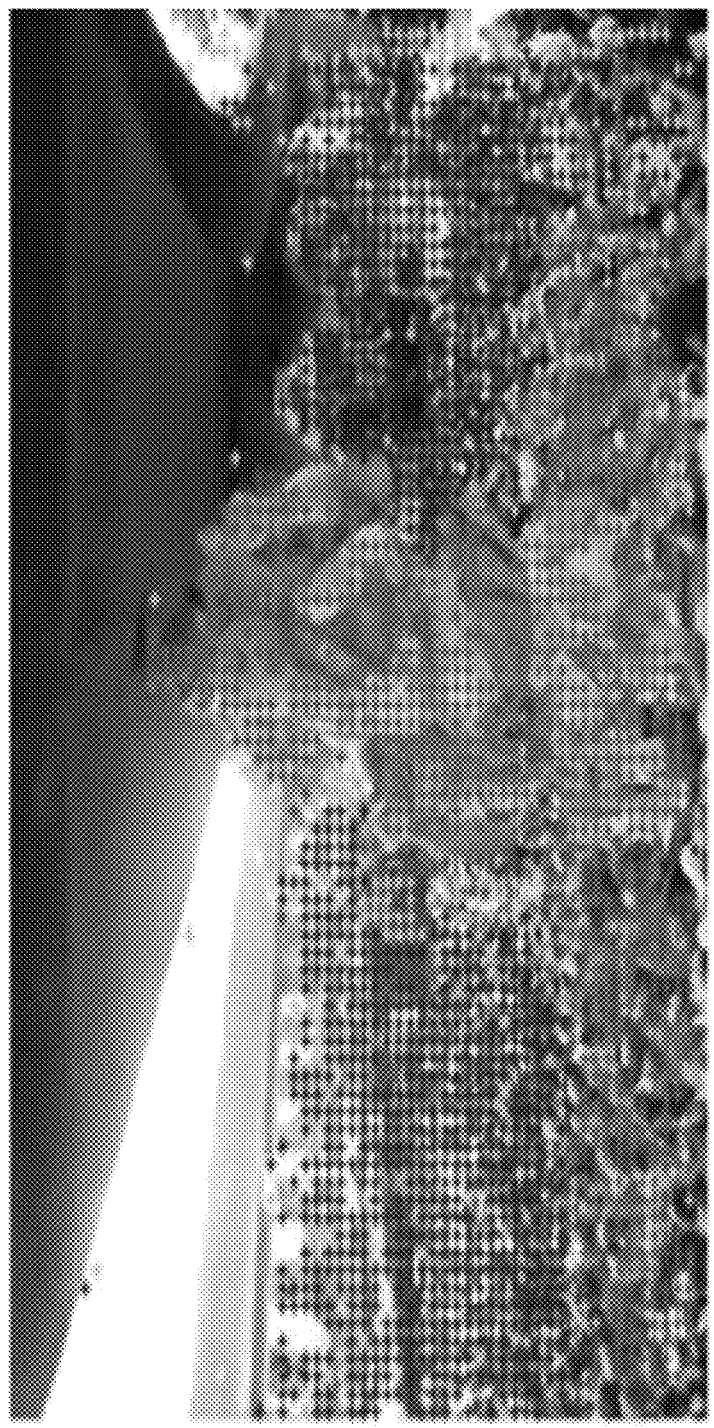

FIGS. 11a, 11b and 11c depict an example scenario where trends are determined in a video. In the depicted example, 50 frames of the video have been considered. FIG. 11a depicts a selected sample of the frame. The optical flow of the pixels is determined and the movement of the pixels in the video is determined. After applying the trend recognition model for the trend recognition of the pixels in the video, 49 dimensional pixel trend information in 2 dimensions are obtained, as depicted in FIG. 11b. After clustering, in the resultant clusters, regions with the same movement trends are together. These regions are represented in FIG. 11c by different colours.

Consider an example of churn prediction. In the example herein, the churn recognition model has been applied on 2000 users. The total mobile usage is measured i.e. calls, SMS, GPRS usage of these users for twelve consecutive weeks. Some of the sample call records for users are given in table 4.

TABLE 4

| | W1 | W2 | W3 | W4 | W5 | W6 | W7 | W8 | W9 | W10 | W11 | W12 |
|---|---|---|---|---|---|---|---|---|---|---|---|---|
| U1 | 0 | 95 | 64 | 0 | 371 | 101 | 180 | 128 | 371 | 295 | 62 | 385 |
| U2 | 407 | 166 | 178 | 125 | 10 | 183 | 50 | 92 | 367 | 195 | 0 | 0 |
| U3 | 53 | 78 | 8 | 232 | 152 | 0 | 0 | 0 | 0 | 0 | 0 | 0 |
| U4 | 0 | 0 | 0 | 0 | 0 | 0 | 0 | 225 | 441 | 313 | 439 | 621 |
| U5 | 129 | 190 | 632 | 206 | 213 | 252 | 329 | 226 | 338 | 362 | 263 | 381 |
| U6 | 369 | 173 | 1 | 146 | 209 | 312 | 301 | 0 | 0 | 42 | 130 | 209 |
| U7 | 129 | 144 | 345 | 256 | 0 | 0 | 0 | 0 | 0 | 0 | 0 | 0 |
| U8 | 89 | 11 | 91 | 0 | 0 | 0 | 0 | 0 | 0 | 0 | 0 | 0 |
| U9 | 496 | 497 | 539 | 343 | 619 | 256 | 483 | 726 | 334 | 0 | 0 | 73 |
| U10 | 1774 | 1352 | 1425 | 512 | 1247 | 1120 | 451 | 1479 | 425 | 1276 | 791 | 1187 |
| U11 | 508 | 455 | 481 | 433 | 1321 | 0 | 0 | 0 | 0 | 0 | 0 | 0 |
| U12 | 0 | 0 | 0 | 0 | 0 | 0 | 0 | 287 | 164 | 153 | 2 | 256 |

Applying churn prediction algorithm, three clusters can be determined, wherein users within one cluster follow a similar trend in their mobile usage. In a first cluster, users who are spending very less in their initial weeks are clustered together (as depicted in table 5).

TABLE 5

| | W1 | W2 | W3 | W4 | W5 | W6 | W7 | W8 | W9 | W10 | W11 | W12 |
|---|---|---|---|---|---|---|---|---|---|---|---|---|
| U4 | 0 | 0 | 0 | 0 | 0 | 0 | 0 | 225 | 441 | 313 | 439 | 621 |
| U12 | 0 | 0 | 0 | 0 | 0 | 0 | 0 | 287 | 164 | 153 | 2 | 256 |

In a second cluster, users who are spending very less in some of their last weeks are clustered together (as depicted in table 6).

TABLE 6

| | W1 | W2 | W3 | W4 | W5 | W6 | W7 | W8 | W9 | W10 | W11 | W12 |
|---|---|---|---|---|---|---|---|---|---|---|---|---|
| U3 | 53 | 78 | 8 | 232 | 152 | 0 | 0 | 0 | 0 | 0 | 0 | 0 |
| U7 | 129 | 144 | 345 | 256 | 0 | 0 | 0 | 0 | 0 | 0 | 0 | 0 |
| U8 | 89 | 11 | 91 | 0 | 0 | 0 | 0 | 0 | 0 | 0 | 0 | 0 |
| U11 | 508 | 455 | 481 | 433 | 1321 | 0 | 0 | 0 | 0 | 0 | 0 | 0 |

In a third cluster, users whose expenditure pattern is high-low-high are clustered together (as depicted in table 7).

TABLE 7

|     | W1   | W2   | W3   | W4  | W5   | W6   | W7  | W8   | W9  | W10  | W11 | W12  |
|-----|------|------|------|-----|------|------|-----|------|-----|------|-----|------|
| U1  | 0    | 95   | 64   | 0   | 371  | 101  | 180 | 128  | 371 | 295  | 62  | 385  |
| U2  | 407  | 166  | 178  | 125 | 10   | 183  | 50  | 92   | 367 | 195  | 0   | 0    |
| U5  | 129  | 190  | 632  | 206 | 213  | 252  | 329 | 226  | 338 | 362  | 263 | 381  |
| U6  | 369  | 173  | 1    | 146 | 209  | 312  | 301 | 0    | 0   | 42   | 130 | 209  |
| U9  | 496  | 497  | 539  | 343 | 619  | 256  | 483 | 726  | 334 | 0    | 0   | 73   |
| U10 | 1774 | 1352 | 1425 | 512 | 1247 | 1120 | 451 | 1479 | 425 | 1276 | 791 | 1187 |

For prediction, information about the users who have already churned is required. Table 8 depicts an example set of information about users who have already churned. With the help of the available information, the users can be labeled as potential churning or not churning. If the trend of the new customers is similar to that of the previously churned customer then it will be highly probable that the user will also churn. If the trend shown by the new user is not similar to previously churned customers then may be the new customer may also not churn in near future.

TABLE 8

|    | W1  | W2  | W3  | W4  | W5  | W6 | W7 | W8 | W9 | W10 | W11 | W12 |
|----|-----|-----|-----|-----|-----|----|----|----|----|-----|-----|-----|
| U1 | 20  | 50  | 8   | 100 | 152 | 0  | 0  | 0  | 0  | 0   | 0   | 0   |
| U2 | 500 | 300 | 350 | 800 | 0   | 0  | 0  | 0  | 0  | 0   | 0   | 0   |

Since the trend followed by the users in the first cluster (table 5) is not similar to the churning users, hence it can be predicted that users in the first cluster may not churn soon. Since the trend followed by the users in the second cluster (table 6) is similar to the churning users, hence it can be predicted that users in the second cluster may churn soon. Since the trend followed by the users in the third cluster (table 7) is not similar to the churning users, hence it can be predicted that users in the third cluster may not churn soon.

Embodiments herein perform trend recognition and prediction at a group level, which is an efficient method for clustering users of similar trend at scale. Embodiments disclosed herein can be easily implemented and can be used to detect and graphically interpret relationships between elements following certain trends.

Embodiments disclosed herein enable compression of large amounts of temporal data to smaller and more manageable amounts of data, hereby reducing the time required for processing the data and complexity of the system required for computing.

Embodiments disclosed herein enable detection of unusual events based on the raw data. An example of the unusual event may be a behaviour of a user which does not match his history and/or the cluster of users to which he belongs. For example, the unusual event may be a user of a telecommunication network sending a large number of SMSs within a short period of time, when he previously used to send only a few SMSs.

Embodiments disclosed herein account for temporal changes in user/object behaviour.

The embodiments disclosed herein can be implemented through at least one software program running on at least one hardware device and performing network management functions to control the elements. The elements shown in FIGS. 1 and 2 include blocks, which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A system comprising:
one or more processors communicatively coupled to a memory, the memory storing one or more instructions which, when executed by the one or more processors, cause the system to:
  obtain and pre-process, using a pre-processing engine, raw temporal data associated with multi-dimensional attributes of one or more users;
  measure, using said pre-processing engine, based on formation of multi-way correspondence table, correspondence between each of said one or more users and each of said determined multi-dimensional attributes, said measurement of correspondence being based on temporal variations of said multidimensional attributes to determine past user behavior for a defined time-period;
  based on processing of correspondence tables of said one or more users, using a dimensionality engine, reduce dimensionality of said raw temporal data associated with said multi-dimensional attributes, wherein the dimensionality of said raw temporal data is reduced by assigning corresponding coordinates in a lower dimension such that that said coordinates maintain similarity, difference, and relationships between said raw temporal data and said corresponding one or more users, wherein upon dimensionality reduction, coordinates corresponding to the users that have similar characteristics are close to each other compared to coordinates corresponding to other users that have dissimilar characteristics; and
  based on reduced dimensionality of said raw temporal data, cluster said coordinates based on similarity of characteristics of the one or more users to generate a plurality of clusters, wherein the clustering comprises:
    applying a density based clustering on said coordinates to obtain density based clusters and noise;
    clustering the noise using distance based clustering to obtain distance based clusters; and
    generating the plurality of clusters based on the density based clusters and the distance based clusters;

assign, using a voting scheme, a first label to samples that form part of a first cluster selected from the plurality of clusters, wherein the assignment of the label is undertaken by:
  assigning a vote to each sample of the first cluster for its label;
  assigning votes to labeled samples of a set of clusters that have similarity value with respect to the first cluster as being higher than a threshold;
  calculating total votes accumulated for each label;
  determining the label having the highest accumulated votes as the first label and assigning the first label to the samples of the first cluster,
wherein the assignment of the coordinates associated with the lower dimension compared to the multidimensional attributes enables compression of data without losing characteristics information associated with the one or more users, thereby reducing time, bandwidth, and memory storage required for processing the raw temporal data and predicting future user behavior based on the processing of said raw temporal data that forms part of said plurality of clusters.

2. The system of claim 1, wherein each of said plurality of clusters is labeled based on trend similarity and classification of users that form part of the respective cluster, and wherein one or more association rules are applied on the plurality of clusters that form part of the lower dimensional space to perform predictive analysis.

3. The system of claim 2, wherein the system determines similarity among the plurality of clusters using a distance metric, and merges one or more clusters if the determined similarity is greater than a defined threshold.

4. The system of claim 2, wherein the system, using a clustering engine, divides at least one cluster of the plurality of clusters into classes based on at least one feature, wherein each user of said at least one cluster is assigned to be a member of at least one class of said classes such that a confidence level is assigned to data points for each predicted action based on the class to which said respective user belongs.

5. The system of claim 1, wherein each row of the correspondence table is associated with a user of the one or more users and each column of the correspondence table is associated with observations made by the one or more users for a single variable at a particular time instance.

6. The system of claim 1, wherein the system assigns one or more relationship attributes to the plurality of clusters based on similarity between the plurality of clusters, wherein the one or more relationship attributes are updated based on a frequency of labels.

* * * * *